(12) United States Patent
Wu et al.

(10) Patent No.: US 9,137,357 B2
(45) Date of Patent: *Sep. 15, 2015

(54) METHOD AND APPARATUS FOR IMPLEMENTING AND FILTERING CUSTOMIZED RINGING SIGNALS

(71) Applicant: Huawei Technologies Co., Ltd., Shenzhen, Guangdong (CN)

(72) Inventors: Lingyan Wu, Nanjing (CN); Jue Wang, Nanjing (CN); Yuan Bao, Shenzhen (CN); Shanyang Ke, Nanjing (CN); Yu Sun, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/143,226

(22) Filed: Dec. 30, 2013

(65) Prior Publication Data

US 2014/0112209 A1 Apr. 24, 2014

Related U.S. Application Data

(63) Continuation of application No. 12/492,292, filed on Jun. 26, 2009, now Pat. No. 8,644,482, which is a continuation of application No. PCT/CN2008/072487, filed on Sep. 24, 2008.

(30) Foreign Application Priority Data

Oct. 9, 2007 (CN) .......................... 2007 1 0123830

(51) Int. Cl.
*H04M 3/02* (2006.01)
*H04M 3/42* (2006.01)
*H04L 29/06* (2006.01)

(52) U.S. Cl.
CPC ............. *H04M 3/02* (2013.01); *H04L 65/1016* (2013.01); *H04L 65/1063* (2013.01); *H04L 65/1069* (2013.01); *H04L 65/1096* (2013.01); *H04M 3/42017* (2013.01)

(58) Field of Classification Search
USPC ................ 370/352, 259; 379/207.16, 201.01, 379/142.02, 220.01
See application file for complete search history.

(56) References Cited

U.S. PATENT DOCUMENTS

| 5,428,670 A | 6/1995 | Gregorek et al. |
| 5,521,965 A | 5/1996 | D'Alessio et al. |

(Continued)

FOREIGN PATENT DOCUMENTS

| CN | 1520211 A | 8/2004 |
| CN | 1735109 A | 2/2006 |

(Continued)

OTHER PUBLICATIONS

1st Office Action in related U.S. Appl. No. 12/492,292 (Jul. 16, 2012).

(Continued)

*Primary Examiner* — William Deane, Jr.
(74) *Attorney, Agent, or Firm* — Leydig, Voit & Mayer, Ltd.

(57) ABSTRACT

A method for implementing Customized Ringing Signal (CRS) services is provided. The method includes: receiving a call request initiated by a caller terminal; obtaining a policy of playing a CRS tone according to the call request, where the policy is a policy of playing a CRS tone, namely, a caller CRS tone or a callee CRS tone, or a policy of filtering the CRS tone; and playing the CRS tone to a callee according to the policy. By setting a policy of playing the CRS tone to the callee in the network or the callee terminal, the users enjoy the CRS services at their own discretion.

11 Claims, 15 Drawing Sheets

(56) References Cited

U.S. PATENT DOCUMENTS

| | | | |
|---|---|---|---|
| 6,548,747 B2* | 4/2003 | Shibata et al. | 84/609 |
| 7,233,658 B2* | 6/2007 | Koser et al. | 379/373.01 |
| 7,336,777 B2* | 2/2008 | Lee et al. | 379/207.08 |
| 7,360,160 B2 | 4/2008 | Matz | |
| 7,440,444 B2* | 10/2008 | Nishida et al. | 370/352 |
| 7,986,775 B2* | 7/2011 | Shi | 379/257 |
| 8,355,704 B2* | 1/2013 | Yang et al. | 455/414.1 |
| 2002/0087656 A1* | 7/2002 | Gargiulo et al. | 709/217 |
| 2004/0121818 A1* | 6/2004 | Paakkonen | 455/567 |
| 2004/0202303 A1* | 10/2004 | Costa-Requena et al. | 379/205.01 |
| 2006/0023862 A1 | 2/2006 | Sutcliffe | |
| 2006/0109970 A1* | 5/2006 | Shim et al. | 379/207.16 |
| 2006/0153355 A1 | 7/2006 | Wang et al. | |
| 2006/0233335 A1 | 10/2006 | Pfleging et al. | |
| 2006/0233339 A1 | 10/2006 | Schwartz | |
| 2006/0245571 A1 | 11/2006 | Radziewicz et al. | |
| 2007/0111919 A1* | 5/2007 | Boerefijn et al. | 510/445 |
| 2007/0121657 A1* | 5/2007 | Boillot et al. | 370/403 |
| 2007/0127642 A1* | 6/2007 | Bae et al. | 379/88.13 |
| 2007/0286401 A1 | 12/2007 | Siddiqui et al. | |
| 2007/0291931 A1 | 12/2007 | Dement | |
| 2008/0118040 A1* | 5/2008 | Shi | 379/69 |
| 2008/0222625 A1* | 9/2008 | Goldfarb et al. | 717/168 |
| 2008/0293390 A1* | 11/2008 | Yang et al. | 455/414.1 |
| 2010/0151824 A1 | 6/2010 | Shang et al. | |

FOREIGN PATENT DOCUMENTS

| | | |
|---|---|---|
| CN | 1758687 A | 4/2006 |
| CN | 1825871 A | 8/2006 |
| CN | 1859480 A | 11/2006 |
| CN | 1968333 A | 5/2007 |
| CN | 1980287 A | 6/2007 |
| CN | 1988691 A | 6/2007 |
| CN | 1997094 A | 7/2007 |
| CN | 101026652 A | 8/2007 |
| CN | 101188642 A | 5/2008 |
| CN | 101202788 A | 6/2008 |
| CN | 101202789 A | 6/2008 |
| CN | 101267583 A | 9/2008 |
| WO | WO 2007019729 A1 | 2/2007 |
| WO | WO 2007063058 A1 | 6/2007 |
| WO | WO 2007144740 A2 | 12/2007 |

OTHER PUBLICATIONS

1st Office Action in corresponding Chinese Patent Application No. 200710123830.3 (Mar. 24, 2011).

Written Opinion of the International Searching Authority in corresponding PCT Patent Application No. PCT/CN2008/072487 (Jan. 8, 2009).

* cited by examiner

METHOD AND APPARATUS FOR IMPLEMENTING AND FILTERING CUSTOMIZED RINGING SIGNALS

CROSS-REFERENCE TO RELATED APPLICATIONS

This application is a continuation of U.S. patent application Ser. No. 12/492,292 filed on Jun. 26, 2009, which is a continuation of International Patent Application No. PCT/CN2008/072487, filed on Sep. 24, 2008, which claims priority to Chinese Patent Application No. 200710123830.3, filed Oct. 9, 2007, all of which are hereby incorporated by reference in their entirety.

FIELD OF THE INVENTION

The present disclosure relates to the communication field, and in particular, to methods and apparatus for implementing Customized Ringing Signal (CRS) services and filtering CRS tones.

BACKGROUND OF THE INVENTION

With the development of mobile communication networks and the popularity of mobile user equipment, operators of mobile networks provide not only the basic call services, but also diversified Value-Added Services (VASs) such as the Ring Back Tone (RBT) service and the Customized Ringing Signal (CRS) service.

The IP Multimedia Subsystem (IMS) is a subsystem proposed in the 3rd Generation Partnership Project (3GPP) Release 5 standard to support IP multimedia services. The IMS is based on the Session Initiation Protocol (SIP). SIP is a text-based signaling protocol that works in client-server mode. The IMS uses a SIP call control mechanism to create, manage and terminate various multimedia services.

The CRS service of the IMS domain is subscribed by the caller or the callee and experienced by the callee. When the caller initiates an IMS call to the callee and the callee is capable of receiving IMS calls (for example, the caller or the callee has activated this service), the ring tone of the callee terminal is replaced by the media such as music and video customized by the caller or the callee before the callee answers the call.

If the service is subscribed by the caller, the service is a caller CRS service; if the service is subscribed by the callee, the service is a callee CRS service.

In the conventional art, both the solution of the caller CRS service and the solution of the callee CRS service are available, meeting different individualized requirements of users.

Given below are the two solutions of the CRS service of the IMS domain in the conventional art.

Solution 1: The caller initiates an IMS call to the callee. If the caller or the callee has subscribed the CRS service, the CRS Application Server (AS) adds the Uniform Resource Locator (URL) of a CRS tone to the header field of the initial call request "INVITE" (such as the Call-Info header field). After receiving the INVITE, the callee downloads the CRS tone to a local directory for playing.

Solution 2: The caller initiates an IMS call to the callee. If the caller or the callee has subscribed to the CRS service, the CRS AS performs media negotiation between the Media Resource Server (MRS) and the callee terminal, and instructs the MRS to play the CRS tone to the callee when the callee rings.

If the CRS media is little, the CRS media may be carried in a SIP message directly. After receiving the SIP message, the callee terminal parses the message body and presents the CRS media to the callee.

However, the inventor of the present disclosure finds that neither the solution to the caller CRS service nor the solution to the callee CRS service in the conventional art specifies how to trigger the CRS service if both the caller and the callee have subscribed to the CRS service. Consequently, the service experience is affected in the case that both the caller and the callee have subscribed to the CRS service.

In addition, the solution to the CRS service in the conventional art provides no function of filtering CRS tones. Therefore, the users can only experience the CRS tones passively, and are not able to select the CRS tones according to their own preferences.

SUMMARY OF THE INVENTION

The embodiments of the present disclosure are implemented through the following technical solutions.

A method for implementing CRS services is provided in an embodiment of the present disclosure. The method includes: (1) receiving a call request initiated by a caller terminal; (2) obtaining a policy of playing a CRS tone according to the call request, wherein the policy of playing the CRS tone is that a caller CRS tone or a callee CRS tone is selected to be played; and (3) playing the CRS tone to a callee according to the policy of playing the CRS tone.

A method for filtering CRS tones is provided in an embodiment of the present disclosure. The method includes: (1) receiving a call request initiated by a caller terminal; (2) obtaining a policy of filtering CRS tones according to the call request; and (3) filtering the CRS tones according to the policy of filtering CRS tones.

A callee terminal is provided in an embodiment of the present disclosure. The callee terminal includes: (1) a filter policy configuring unit, adapted to set a policy of filtering a CRS tone, wherein the policy of filtering the CRS tone is that at least one of the caller CRS tone and the callee CRS tone needs to be filtered out; and (2) a filter policy parsing unit, adapted to judge whether at least one of the caller CRS tone and the callee CRS tone needs to be filtered out according to the set policy of filtering the CRS tone.

A callee terminal is provided in an embodiment of the present disclosure. The callee terminal includes: (1) a receiving unit, adapted to receive a call request initiated by a caller terminal; (2) a CRS policy configuring unit, adapted to set a policy of playing a CRS tone, wherein the policy of playing the CRS tone is that a caller CRS tone or a callee CRS tone needs to be played; (3) a CRS policy parsing unit, adapted to obtain the policy of playing the CRS tone according to the call request, wherein the policy of playing the CRS tone is that the caller CRS tone or the callee CRS tone needs to be played; and (4) a CRS playing unit, adapted to play the CRS tone to the callee according to the policy of playing the CRS tone.

The benefits of the present disclosure are: through the embodiments of the present disclosure, a policy of playing a CRS tone to the callee is set at the CRS AS or the callee terminal, and the CRS service can be experienced in the case that both the caller and the callee have subscribed to the CRS service. Users can select the customized CRS media on the network, and make the best of the network media file resources of the users, thus implementing unified configuration and management easily. Moreover, the user-defined CRS media files can be downloaded through the callee terminal, and played to the callee, which enhances the availability and fun of CRS media resources. Furthermore, through the embodiments of the present disclosure, the callee can filter out or reselect a CRS tone using a CRS filter AS or by setting a policy of filtering CRS tones at the callee terminal. Therefore, individuals can set and select a CRS tone at their discretion.

DETAILED DESCRIPTION OF THE INVENTION

Before the embodiments of the present disclosure are described in detail, it is necessary to clarify some concepts. In the embodiments of the present disclosure, media files played to the callee before setup of the conversation between the caller and the callee are called "CRS tones." CRS tones come in these types: (1) caller CRS tone—a multimedia file subscribed by the caller for being played to the callee; and (2) callee CRS tone—a multimedia file subscribed by the callee for being played to the callee.

Figure 1:
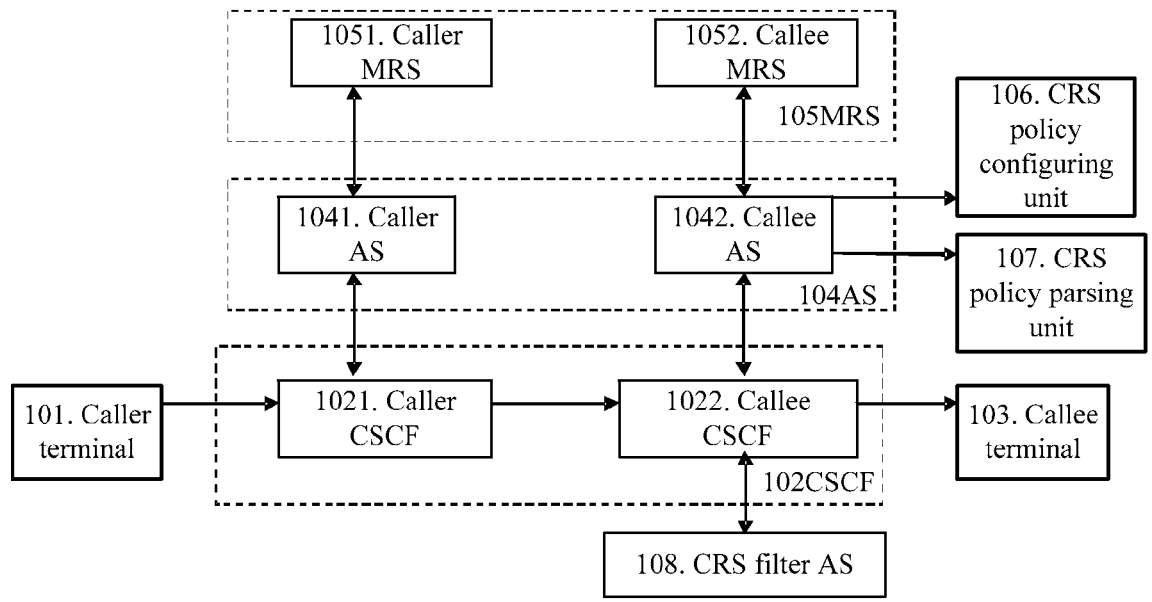
FIG. 1 shows a system for implementing CRS services in a first embodiment of the present disclosure.

As shown in FIG. 1, a system for implementing CRS services is provided in the first embodiment of the present disclosure. The system includes: a caller terminal 101, a Call Session Control Function (CSCF) server 102, a CRS AS 104, an MRS 105, a callee terminal 103, a CRS policy configuring unit 106, and a CRS policy parsing unit 107. The caller terminal 101 is adapted to initiate a call request; the CSCF server 102 is adapted to send the call request of the caller terminal 101 to the CRS AS 104; the CRS AS 104 comes in two types: a caller CRS AS 1041, and a callee CRS AS 1042, both being adapted to perform media negotiation with the MRS 105 and play a CRS tone to the callee; the CRS policy configuring unit 106 is adapted to set a policy of playing CRS tones, which may be a policy of playing caller CRS tones or a policy of playing callee CRS tones; and the CRS policy parsing unit 107 is adapted to parse the policy of playing CRS tones. In FIG. 1, the CRS policy configuring unit 107 and the CRS policy parsing unit 107 are set on the callee CRS AS 1042.

More broadly, the system for implementing CRS services may further include a CRS filter AS 108, adapted to set a policy of filtering CRS tones. It is worthy of attention that the filter policy may also be set in the callee terminal 103 as required. Furthermore, the CRS filter AS 108 may also be a callee CRS AS.

More broadly, the CRS policy configuring unit 106 may also be set in the callee terminal 103 or in an entity, for example, a CRS management system or a network address book of the user, which be accessed by the callee CRS AS 1042. The CRS policy parsing unit 107 may be set in the callee CRS AS 1042, or in the callee terminal 103.

The policy of playing CRS tones is set in the following way.

The system for implementing CRS services can set a policy of playing CRS tones as required by the user. Specifically, the policy may be a policy of filtering CRS tones, a policy of playing caller CRS tones, or a policy of playing callee CRS tones. The system may also set whether to play the callee CRS tone on the precondition of filtering out the caller CRS tone.

Supposing a caller CRS tone or a callee CRS tone needs to be set, the user may set to play the CRS tone customized by the caller in any case, that is, set the priority of the caller CRS tone to be higher than that of the callee CRS tone. The user may also set to play the caller CRS tone in some conditions and play the callee CRS tone in other conditions, or set to play different tones in different conditions, for example, play different callee CRS tones according to different callers or different time segments.

Besides, if both the caller CRS service and the callee CRS service are deployed concurrently, filtering of caller CRS tones or callee CRS tones is equivalent to playing of callee CRS tones or caller CRS tones with respect to the implementation solution and user experience.

The following table gives an example of a policy "playing different tones according to different callers" set by user A in a callee CRS AS 1042.

TABLE 1

| Settings made by the user in a callee CRS AS | | |
|---|---|---|
| Condition | CRS Tone Identifier | CRS Tone Number |
| The callers are B and C | callee-tone | Tone number 1 |
| The callers are D and E | | Tone number 2 |
| Other callers (including F and G) | caller-tone | Tone number 3 |

The corresponding relation between "CRS tone identifier" and "condition", and between "CRS tone number" and "condition" in the foregoing table may be set in an entity (for example, callee CRS management system) accessible to the callee CRS AS 1042 or the callee CRS AS 1042. Alternatively, the "CRS tone identifier" and the "CRS tone number" are set separately. That is, the corresponding relation between the "CRS tone identifier" and the "condition" is set in the callee CRS AS 1042, and the corresponding relation between the "CRS tone number" and the "condition" is set in the CRS management system.

If the CRS tone identifier is carried in a SIP message, a new SIP header field may be added or a field header value may be extended or the Session Description Protocol (SDP) is extended to carry the CRS tone identifier. Specifically, the CRS tone identifier may be set in the "Contact" header field, for example, "caller-tone" is added to the "schemes" value of "Contact."

This embodiment describes two methods of playing CRS tones. The first method is to set up an early media session between the MRS and the callee terminal and play a CRS tone to the callee; and the other method is that the callee terminal downloads a CRS file from the CRS platform and plays it locally.

In the signaling flowcharts of the second to thirteenth embodiments, the signaling forwarding process and the service triggering process performed through the core network (CSCF: S-CSCF and P-CSCF) are simplified to highlight the special processes of the caller and callee RBT/CRS control and RBT/CRS filtering. In the second to thirteenth embodiments, all SIP messages are forwarded through the CSCF route. The call signaling is routed to the S-CSCF, and then triggered to the RBT/CRS AS in the IMS domain according to the service subscription relation of the user, and then the subsequent RBT/CRS service process is implemented.

In the second to fifth embodiments, the user plays a caller CRS tone or a callee CRS tone to the callee by setting a CRS playing policy in the CRS AS.

Figure 2:
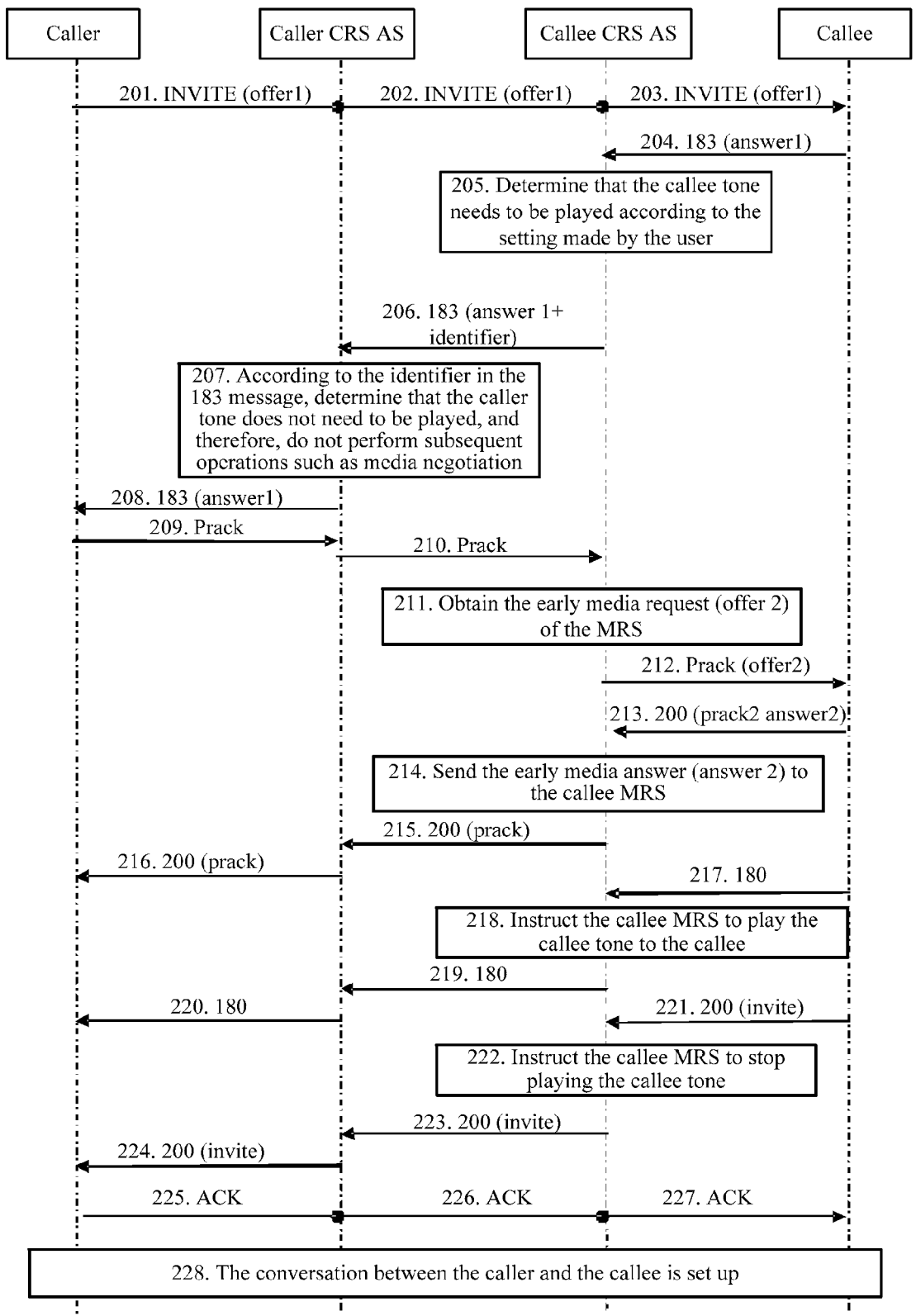
FIG. 2 shows a method for implementing callee CRS services in a second embodiment of the present disclosure.

As shown in FIG. 2, the second embodiment employs the settings in Table 1, and provides a method for implementing callee CRS tones, taking the early media negotiation as an example. The involved process is: Caller B makes a call to callee A, and plays a callee CRS tone to callee A.

Step 201: The caller terminal sends a call request (namely, an INVITE message) to the caller CRS AS. The INVITE message carries a caller terminal identifier, a callee terminal identifier, and a normal media SDP request (i.e., offer 1) for the caller terminal to set up a call.

According to the caller terminal identifier carried in the INVITE message and the subscription relation between the caller terminal identifier and the CRS service stored in the Home Subscriber Server (HSS), the caller CSCF parses the INVITE message to know that the caller terminal is a CRS service subscriber, and sends the INVITE message to the caller CRS AS.

Step 202: The caller CRS AS sends the call request "INVITE" to the callee CRS AS through the callee CSCF.

The method of performing this step may be: according to the callee terminal identifier carried in the INVITE message and the subscription relation between the callee terminal identifier and the CRS service stored in the HSS, the callee CSCF parses the INVITE message to know that the callee terminal is a CRS service subscriber, and sends the INVITE message to the callee CRS AS.

Step 203: The callee CRS AS sends the call request "INVITE" to the callee terminal through the callee CSCF.

Step 204: The callee terminal performs normal media negotiation with the caller terminal through a normal media SDP request (i.e., offer 1) according to the capabilities of the callee terminal, and sends a provisional response to the callee CRS AS. The provisional response carries a normal media SDP answer (i.e., answer 1) applicable to the call after negotiation between the caller terminal and the callee terminal. The provisional response may be a 183 message.

Step 205: The callee CRS AS determines the callee CRS tone according to the settings made by the user. In the process provided in this embodiment, it is supposed that the CRS tone identifier is "callee-tone" which indicates play of a callee CRS tone, and the media number is "CRS tone number 1."

Step 206: The callee CRS AS sends a second provisional response (namely, a 183 message) to the caller CRS AS. The second provisional response carries not only a normal media SDP answer (i.e., answer 1), but also a "callee CRS tone" identifier that indicates play of a callee CRS tone.

Step 207: According to the "callee CRS tone" identifier in the second provisional response, the caller CRS AS determines that no caller CRS tone needs to be played, and performs early callee CRS media negotiation in the following steps 211-214.

Step 208: The caller CRS AS sends the first provisional response (namely, the first 183 message) to the caller terminal. The first 183 message carries the normal media SDP answer (i.e., answer 1) applicable to the call after negotiation between the caller terminal and the callee terminal.

Steps 209-210: The caller terminal sends a provisional reliable response to the callee CRS AS through the caller CRS AS. The provisional reliable response is a first Prack message.

Step 211: After receiving the first Prack message, the callee CRS AS obtains an early CRS media SDP request (i.e., offer 2) from the callee MRS. The callee CRS AS is adapted to perform early CRS media negotiation with the callee terminal.

Step 212: The callee CRS AS sends a second Prack message to the callee terminal. The second Prack message carries the early CRS media SDP request (i.e., offer 2).

Step 213: The callee terminal performs early media negotiation through the early CRS media SDP request (i.e., offer 2) according to the capabilities of the callee terminal, and sends a first 200 (i.e., Prack answer 2) message to the callee CRS AS. The first 200 message carries an early CRS media SDP answer (i.e., answer 2) for playing a callee CRS tone.

Step 214: The callee CRS AS sends the early CRS media SDP answer (i.e., answer 2) to the callee MRS.

Steps 215-216: The callee CRS AS sends a second 200 (i.e., Prack) message to the caller terminal.

Step 217: The callee terminal sends a ringing signal "180" to the callee CRS AS.

Step 218: The callee CRS AS instructs the callee MRS to play a callee CRS tone to the callee terminal.

Steps 219-220: The callee CRS AS sends the ringing signal "180" to the caller terminal through the caller CRS AS.

Step 221: The callee goes off-hook, and the callee terminal sends a 200 (i.e., invite) message to the callee CRS AS, indicating that the callee has gone off-hook.

Step 222: The callee CRS AS instructs the callee MRS to stop playing the callee CRS tone to the callee terminal.

Steps 223-224: The callee CRS AS sends a 200 (i.e., invite) message to the caller terminal, indicating that the callee has gone off-hook.

Steps 225-227: The caller terminal sends an ACK message to the callee terminal.

Step 228: The conversation between the caller and the callee is set up.

Figure 3:
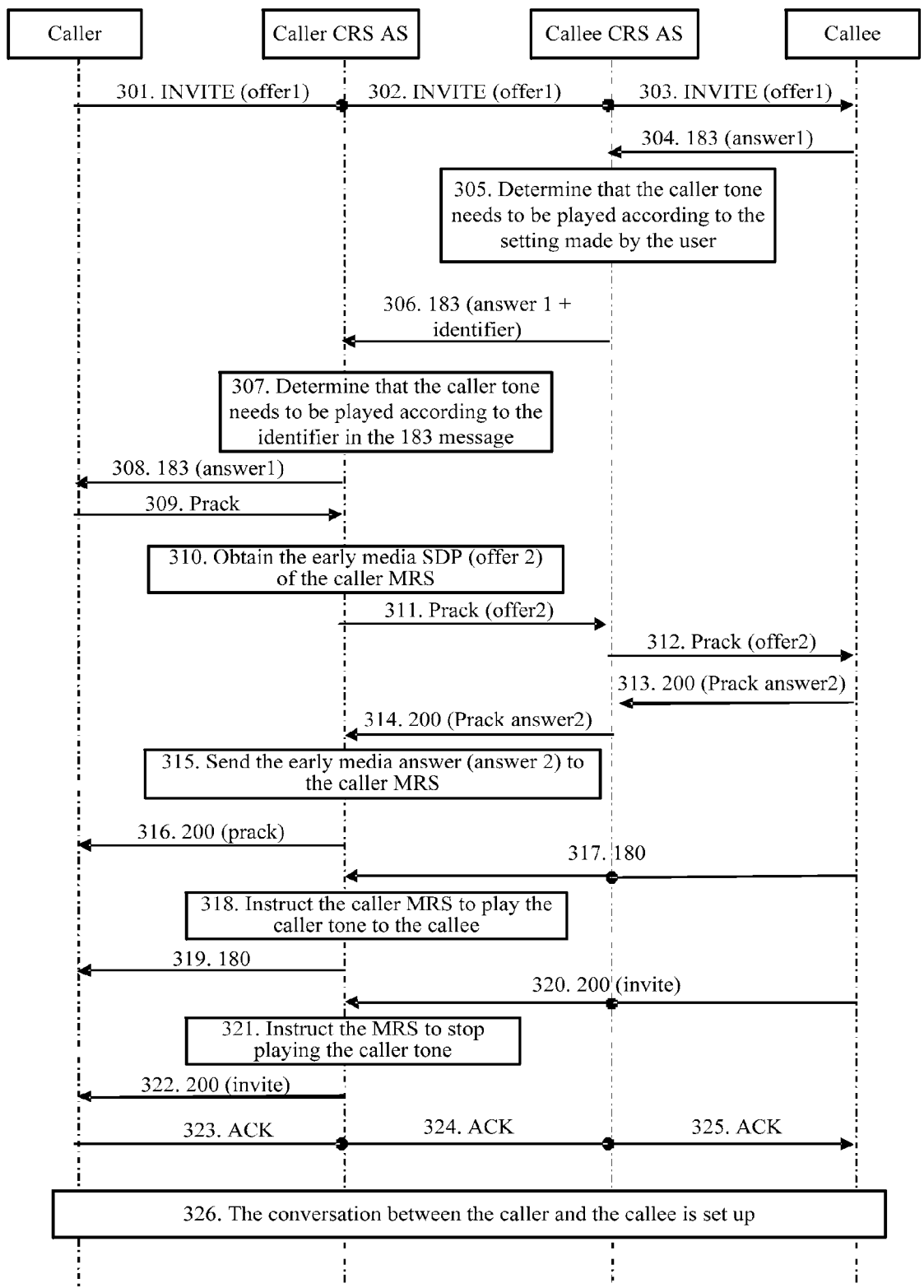
FIG. 3 shows a method for implementing caller CRS services in a third embodiment of the present disclosure.

As shown in FIG. 3, a method for implementing caller CRS services is provided in the third embodiment of the present disclosure. Being similar to FIG. 2, the third embodiment takes the early media negotiation as an example. The third embodiment differs from the process shown in FIG. 2 in that: in step 305, the callee CRS AS determines to play a caller CRS tone according to the settings made by the user. Therefore, the early media negotiation in the technical solution provided in the third embodiment is performed between the caller CRS AS and the caller MRS. The detailed process is as follows.

Steps 301-304: These steps are the same as steps 201-204 in FIG. 2. That is, the caller sends a call request "INVITE" to the callee terminal. The callee terminal sends a provisional response to the callee CRS AS according to the INVITE message.

Step 305: The callee CRS AS determines the callee CRS tone according to the settings made by the user. In the process provided in this embodiment, it is supposed that the CRS tone identifier is "caller-tone" which indicates play of a caller CRS tone, and the media number is "CRS tone number 3."

Step 306: The callee CRS AS sends a second provisional response (namely, a 183 message) to the caller CRS AS. The second provisional response carries not only a normal media SDP answer (i.e., answer 1), but also a "caller CRS tone" identifier that indicates play of a caller CRS tone.

Step 307: According to the "caller CRS tone" identifier that indicates play of a caller CRS tone and is carried in the second provisional response, the caller CRS AS determines that a caller CRS tone needs to be played, and performs caller CRS media negotiation.

Step 308: The caller CRS AS sends the first provisional response (namely, the first 183 message) to the caller terminal. The first 183 message carries the normal media SDP answer (i.e., answer 1) applicable to the call after negotiation between the caller terminal and the callee terminal.

Step 309: The caller terminal sends a provisional reliable response (namely, a first Prack message) to the caller CRS AS.

Step 310: After receiving the first Prack message, the caller CRS AS obtains the early media SDP request (i.e., offer 2) from the caller MRS for the purpose of performing early caller CRS media negotiation.

Steps 311-312: The caller CRS AS sends a provisional reliable response (namely, the second Prack message (i.e., offer 2)) to the callee terminal. The second Prack message carries the early media SDP request (i.e., offer 2) of the caller MRS.

Step 313: The callee terminal performs early media negotiation with the caller MRS through the early media SDP request (i.e., offer 2) according to the capabilities of the callee terminal, and sends a first 200 (i.e., Prack answer 2) message to the callee CRS AS. The first 200 message carries the early CRS media answer (i.e., answer 2) for playing the callee CRS tone.

Steps 314-315: The callee CRS AS sends the first 200 (i.e., Prack answer 2) to the caller MRS. The first 200 (i.e., Prack) message carries the early caller CRS media answer (i.e., answer 2), where the early caller CRS media answer is made after the early media SDP request (i.e., offer 1) negotiation between the callee terminal and the caller MRS.

Steps 316: The caller CRS AS sends a second 200 (i.e., Prack) message to the caller terminal.

Step 317: The callee terminal sends a ringing signal "180" to the caller CRS AS.

Step 318: The caller CRS AS instructs the caller MRS to play the caller CRS tone number 3 to the callee terminal.

Step 319: The caller CRS AS sends the ringing signal "180" to the caller terminal.

Step 320: The callee terminal goes off-hook, and sends a 200 (i.e., invite) message to the callee CRS AS, and the callee CRS AS sends the 200 (i.e., invite) message to the caller CRS AS.

Step 321: The caller CRS AS instructs the caller MRS to stop playing the caller CRS tone to the callee terminal.

Step 322: The caller CRS AS sends a 200 (i.e., invite) message to the caller terminal.

Steps 323-325: The caller terminal sends an ACK message to the callee terminal.

Step 326: The conversation between the caller and the callee is set up.

In the second or third embodiment described above, a policy of playing a CRS tone needs to be pre-configured. The policy may be pre-configured in the callee CRS AS or the management system of the callee CRS AS. According to the policy of playing the CRS tone, the callee CRS AS determines the necessity of playing a caller CRS tone or callee CRS tone to the callee. According to the judgment result made in steps 205 and step 305, the callee CRS AS adds a "caller CRS tone" identifier or "callee CRS tone" identifier into the 183 message returned to the caller CRS AS. According to the identifier in the 183 message, the caller CRS AS determines whether to trigger a caller CRS tone. If the identifier in the 183 message is a "caller CRS tone" identifier, the caller CRS AS performs early caller CRS media negotiation, and plays a caller CRS tone to the callee. Otherwise, the caller CRS AS does not perform early media negotiation. In this way, the caller CRS tone or callee CRS tone is played to the callee.

Besides, the third embodiment supposes that the caller is a CRS service subscriber. If the caller has not subscribed to the CRS service, two processing modes are practicable:

Processing mode 1: No special processing is required, and the callee terminal plays a local ring tone.

Processing mode 2: A callee CRS tone is played. The callee CRS AS determines that the caller is not a CRS service subscriber if finding lack of the early caller CRS media SDP request (i.e., offer 2) after receiving the Prack message in step 11. In this case, the callee CRS AS may obtain the media request of the callee MRS to perform early callee CRS media negotiation and play the callee CRS tone to the callee in the subsequent process.

Figure 4:
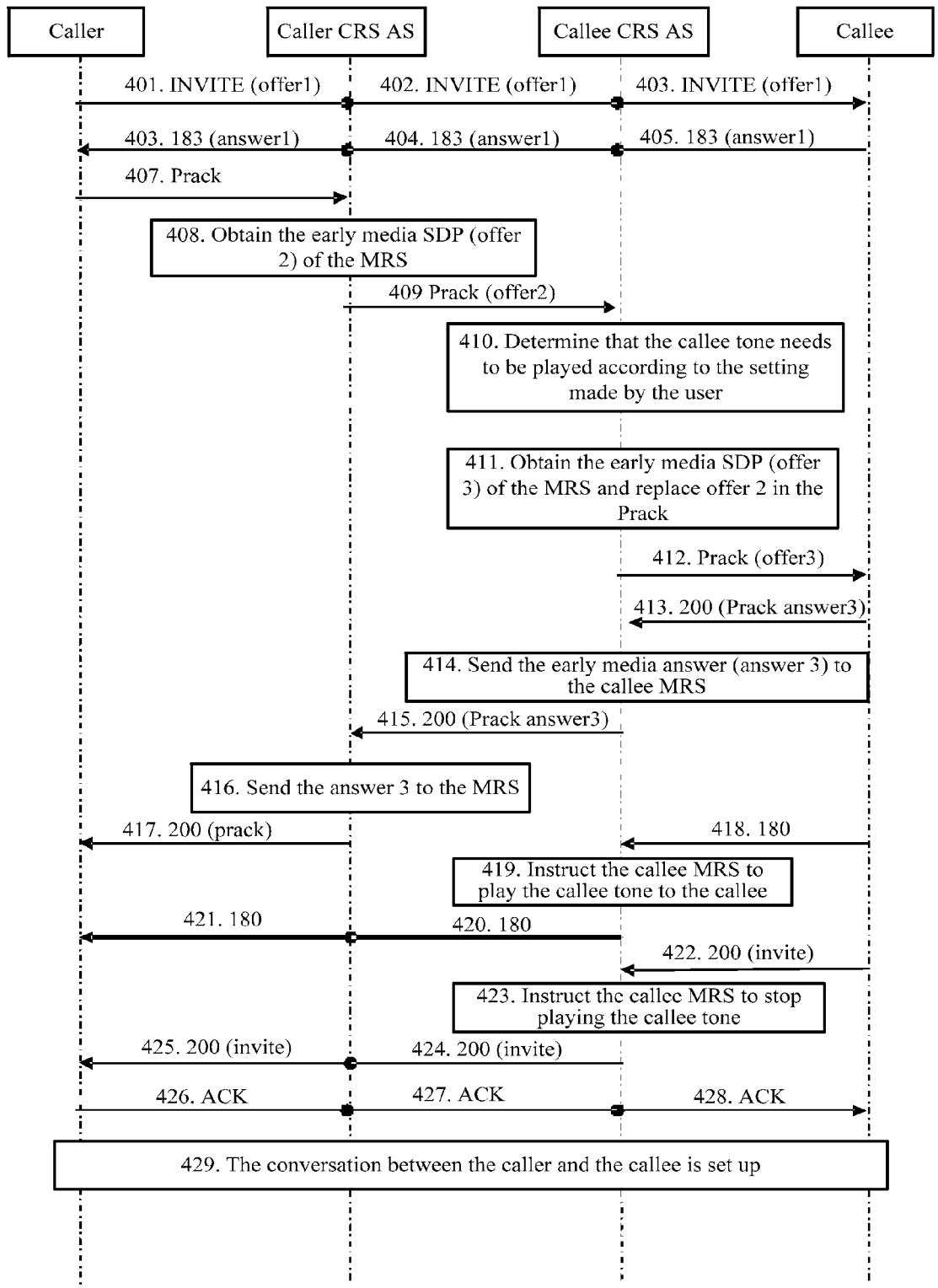
FIG. 4 shows a method for implementing callee CRS services in a fourth embodiment of the present disclosure.

FIG. 4 shows a method for implementing callee CRS services in the fourth embodiment of the present disclosure. The play of the callee CRS tone in the fourth embodiment differs from that in the foregoing embodiments such as the second embodiment in the condition of triggering the callee CRS media negotiation. In the second embodiment, the second provisional response "183 message" that carries a callee CRS tone identifier is sent to instruct the caller CRS AS not to perform the caller CRS tone process. In the fourth embodiment, the callee CRS AS rejects the early caller CRS media negotiation, and substitutes the early callee media SDP request (i.e., offer 3) for the early caller media SDP request (i.e., offer 2). The method for implementing callee CRS services in the fourth embodiment of the present disclosure includes the following steps.

Steps 401-403: These steps are the same as steps 201-203 in FIG. 2. That is, the caller sends a call request "INVITE" to the callee terminal.

Steps 404-406: Step 404 is consistent with step 204 in FIG. 2; that is, the callee terminal sends a first provisional response (namely, a first 183 message) to the callee CRS AS according to the INVITE request. Steps 405-406: The callee CRS AS sends the first 183 message to the caller terminal.

Step 407: The caller terminal sends a first provisional reliable response (namely, a first Prack message) to the caller CRS AS.

Step 408: The caller CRS AS obtains the early media SDP request (i.e., offer 2) from the caller MRS for the purpose of performing early CRS media negotiation with the callee terminal.

Step 409: The caller CRS AS sends a second provisional reliable response (namely, a second Prack message (i.e., offer 2)) to the callee CRS AS. The second Prack message carries the early media SDP request (i.e., offer 2) of the caller MRS.

Step 410: The callee CRS AS determines that a callee CRS tone needs to be played according to the settings made by the user.

Steps 411-429: The callee CRS media negotiation is performed, and the callee MRS plays a callee CRS tone to the callee terminal.

In the fourth embodiment of the present disclosure, the callee CRS AS determines that early callee CRS media negotiation needs to be performed according to the judgment result. After receiving the early caller CRS media request from the caller CRS AS, the callee CRS AS substitutes the early callee CRS media request for the early caller CRS media request to perform the early callee CRS media negotiation. Besides, through the method provided in this embodiment, a caller CRS tone may be played to the callee. That is, after determining that a caller CRS tone needs to be played according to the judgment result, the callee CRS AS performs early caller CRS media negotiation, and plays a caller CRS tone to the callee terminal.

Figure 5:
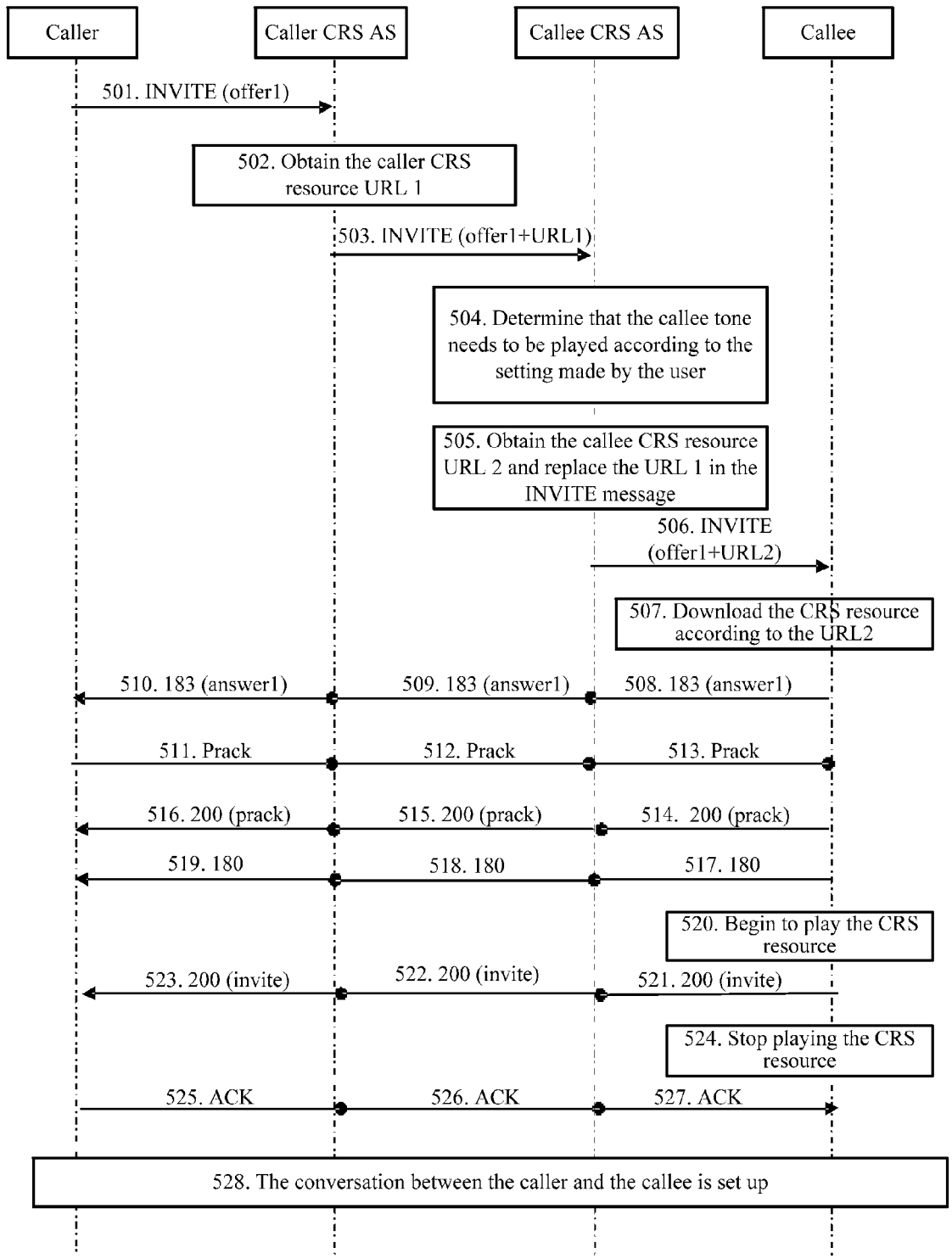
FIG. 5 shows a method for implementing callee CRS services in a fifth embodiment of the present disclosure.

FIG. 5 shows a method for implementing callee CRS services in the fifth embodiment of the present disclosure. Compared with the method of playing a callee CRS tone in the foregoing embodiments such as the second embodiment, the method in the fifth embodiment differs in the mode of restricting play of the caller CRS tone. In the second embodiment, a solution to early CRS media negotiation is provided, and the second provisional response (namely, the 183 message) that carries a callee CRS tone identifier is sent to instruct the caller CRS AS not to trigger the caller CRS tone process. In the fifth embodiment, a solution to download and play is provided, and the play of the caller CRS tone is restricted by deleting the caller CRS tone URL in the message. The method for implementing callee CRS services in the fifth embodiment includes the following steps.

Step 501: This step is the same as step 201 in FIG. 2. That is, the caller terminal sends a first call request (namely, an INVITE message) to the caller CRS AS.

Step 502: The caller CRS AS obtains the caller CRS media resource (i.e., URL 1).

Step 503: The caller CRS AS sends a second call request to the callee CRS AS through the callee CSCF. The second call request carries the normal media SDP request (i.e., offer 1) of the caller terminal and the caller CRS media resource link (i.e., URL1).

According to the callee terminal identifier carried in the INVITE message and the subscription relation between the callee terminal identifier and the CRS service stored in the HSS, the callee CSCF parses the INVITE message to know that the callee terminal is a CRS service subscriber, and sends the INVITE message to the callee CRS AS.

If the CRS media resource is little, the CRS media may be sent to the callee through a SIP message (such as an INVITE message) directly to avoid the trouble of sending a URL of the media and downloading the media on the callee terminal.

Step 504: The callee CRS AS determines that a callee CRS tone needs to be played according to the settings made by the user.

Step 505: The callee CRS AS obtains the callee CRS media resource link (i.e., URL 2), and substitutes the callee CRS media resource link (i.e., URL 2) for the caller CRS media resource link (i.e., URL 1).

Step 506: The callee CRS AS sends a third call request (i.e., an INVITE message) to the callee terminal. The third call request carries the normal media SDP request (i.e., offer 1) of the caller terminal and the callee CRS media resource link (i.e., URL 2).

Step 507: The callee terminal downloads the CRS media resource according to the received callee CRS media resource link (i.e., URL 2).

Steps 508-510: The callee terminal sends a 183 message to the caller terminal. The 183 message carries the normal media SDP answer (i.e., answer 1) applicable to the call after negotiation between the caller terminal and the callee terminal.

Steps 511-513: The caller terminal sends a Prack message to the callee terminal after receiving the 183 message.

Steps 514-516: The callee terminal sends a 200 (i.e., Prack) message to the caller terminal.

Steps 517-519: The callee terminal sends a ringing signal "180" to the caller terminal.

Step 520: The callee terminal begins to play the downloaded CRS media resource.

Steps 521-523: The callee terminal sends a 200 (i.e., invite) message to the caller terminal, indicating that the callee terminal has gone off-hook.

Step 524: The callee terminal stops playing the CRS resource.

Steps 525-527: The caller terminal sends an ACK message to the callee terminal.

Step 528: The conversation between the caller and the callee is set up.

In the fifth embodiment described above, a callee CRS tone is played to the callee. Likewise, a caller CRS tone may be played to the callee. In step 504 in the fifth embodiment, if determining that a caller CRS tone needs to be played, the callee CRS AS sends the CRS resource link (i.e., URL 1) obtained from the caller CRS AS to the callee terminal. The callee terminal downloads the CRS resource through the obtained CRS resource link (i.e., URL 1), and plays the caller CRS tone to the callee terminal. In this way, the caller CRS tone is played to the callee terminal.

In the fifth embodiment and variations thereof, a method for playing a CRS tone to the callee is implemented by setting a policy in the network. Likewise, a CRS tone can be played to the callee by setting a policy at the callee terminal. That is, the caller CRS media resource (or its URL) and the callee CRS media resource (or its URL) are sent to the callee terminal, and the callee terminal chooses to display or download the caller CRS tone or callee CRS tone for playing according to the policy of playing the CRS tone.

In the sixth and seventh embodiments, the user plays a caller CRS tone or a callee CRS tone to the callee by setting a CRS playing policy at the callee terminal.

Figure 6:
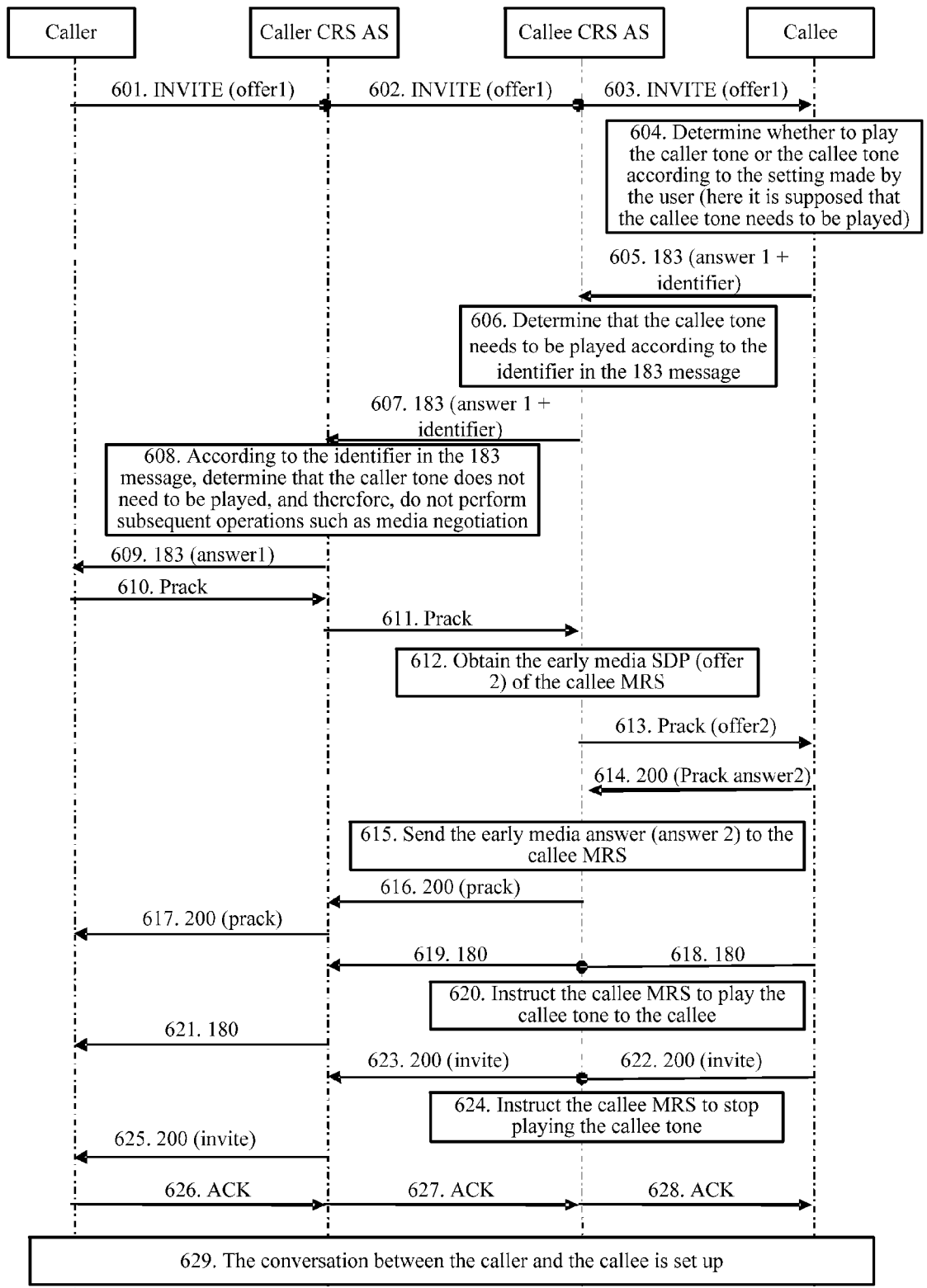
FIG. 6 shows a method for implementing callee CRS services in a sixth embodiment of the present disclosure.

FIG. 6 shows a method for implementing callee CRS services in the sixth embodiment of the present disclosure. The method includes the following steps:

Steps 601-603: These steps are the same as steps 201-203 in FIG. 2. That is, the caller sends a call request "INVITE" to the callee terminal.

Step 604: The callee terminal performs normal media negotiation with the caller terminal through a normal media SDP request (i.e., offer 1) according to the capabilities of the callee terminal, and determines that a callee CRS tone needs to be played according to the settings made by the user.

Step 605: The callee terminal sends a provisional response to the callee CRS AS. The provisional response carries a normal media SDP answer (i.e., answer 1) applicable to the call after negotiation between the caller terminal and the callee terminal, and a "callee CRS tone" identifier that indicates play of a callee CRS tone. The provisional response may be a 183 message.

Step 606: The callee CRS AS determines that a callee CRS tone needs to be played according to the callee CRS tone identifier in the 183 message.

Steps 607-611: These steps are the same as steps 206-210 in FIG. 2, and are not described further.

Steps 612-620: These steps are the same as steps 211-218 in FIG. 2. That is, callee CRS media negotiation is performed, and the callee MRS is instructed to play a callee CRS tone to the callee terminal.

Step 621: The caller CRS AS sends a ringing signal "180" to the caller terminal.

Step 622-623: The callee terminal goes off-hook, and sends a 200 (i.e., invite) message to the callee CRS AS. The callee CRS AS sends the 200 (i.e., invite) message to the caller CRS AS, indicating that the callee has gone off-hook.

Step 624: The callee CRS AS instructs the callee MRS to stop playing the callee CRS tone to the callee terminal.

Step 625: The caller CRS AS sends a 200 (i.e., invite) message to the caller terminal, indicating that the callee has gone off-hook.

Steps 626-628: The caller terminal sends an ACK message to the callee terminal.

Step 629: The conversation between the caller and the callee is set up.

In the sixth embodiment of the present disclosure, a callee CRS tone is played to the callee by setting a policy of playing the callee CRS tone at the callee terminal. Likewise, a caller CRS tone may be played to the callee terminal by setting a policy of playing the caller CRS tone at the callee terminal.

Figure 7:
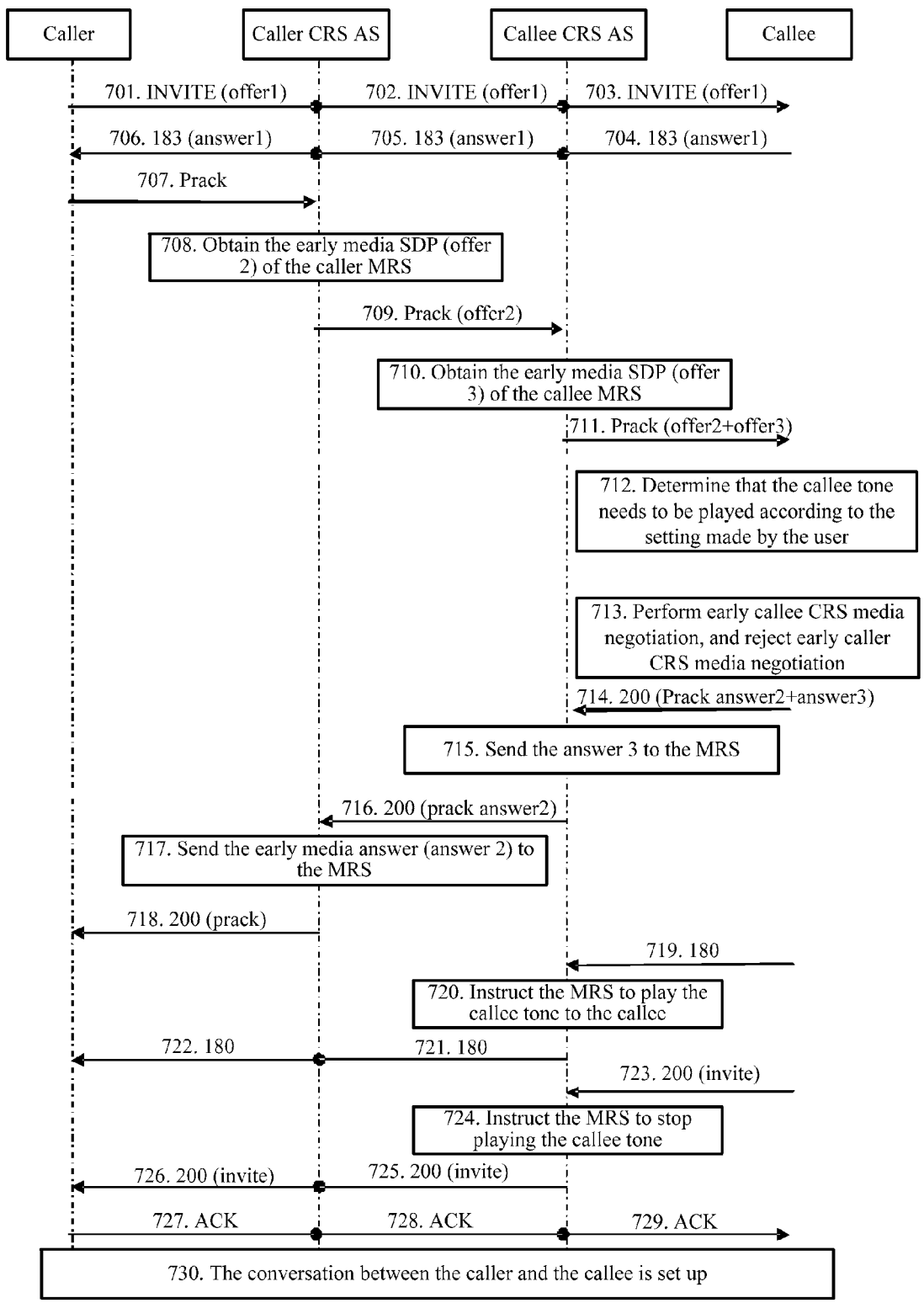
FIG. 7 shows a method for implementing callee CRS services in a seventh embodiment of the present disclosure.

FIG. 7 shows a method for implementing callee CRS services in the seventh embodiment of the present disclosure. Compared with the method of playing a callee CRS tone in the foregoing embodiments such as the sixth embodiment, the method in the seventh embodiment differs in that: in the sixth embodiment, the second provisional response (i.e., 183 message) that carries a "callee CRS tone" identifier is sent to instruct the caller CRS AS not to perform the caller CRS tone process, and instruct the callee CRS AS to perform the callee CRS tone process; in the seventh embodiment, the callee terminal chooses to perform callee CRS media negotiation, and rejects the caller CRS media negotiation. The method for implementing callee CRS services in the seventh embodiment of the present disclosure includes the following steps.

Steps 701-703: These steps are the same as steps 201-203 in FIG. 2. That is, the caller sends a call request "INVITE" to the callee terminal.

Step 704-706: The callee terminal performs normal media negotiation with the caller terminal through a normal media SDP request (i.e., offer 1) according to the capabilities of the callee terminal, and sends a 183 message to the caller terminal. The 183 message carries a normal media SDP answer (i.e., answer 1) applicable to the call after negotiation between the caller terminal and the callee terminal.

Step 707: The caller terminal sends a first provisional reliable response (namely, a first Prack message) to the caller CRS AS.

Step 708: The caller CRS AS obtains the early caller CRS media SDP request (i.e., offer 2) from the caller MRS.

Step 709: The caller CRS AS sends a second provisional reliable response (namely, a second Prack message) to the callee CRS AS. The second Prack message carries the early caller CRS media SDP request (i.e., offer 2).

Step 710: The callee CRS AS obtains an early callee CRS media SDP request (i.e., offer 3) from the callee MRS.

Step 711: The callee CRS AS sends a third provisional reliable response (namely, a third Prack message) to the callee terminal. The third Prack message carries the early caller CRS media SDP request (i.e., offer 2) and the early callee CRS media SDP request (i.e., offer 3).

Step 712: The callee terminal determines that a callee CRS tone needs to be played according to the settings made by the user.

Step 713: The callee terminal performs media negotiation with the callee MRS through the early callee CRS media SDP request (i.e., offer 3), and rejects the media negotiation performed through the early caller CRS media SDP request (i.e., offer 2). The rejection may be performed by setting the callee terminal port to "0" in the answer 2 or by modifying the media direction attribute parameter to "sendonly" that indicates sending rather than receiving of media streams.

Step 714: The callee terminal sends a 200 (including Prack answer 2 and answer 3) message to the callee CRS AS.

Step 715: The callee CRS AS sends the early callee CRS media answer (i.e., answer 3) to the callee MRS.

Step 716: The callee CRS AS sends a 200 (i.e., Prack answer 2) message to the caller CRS AS.

Step 717: The caller CRS AS sends an early CRS media SDP answer (i.e., answer 2) to the caller MRS.

Step 718: The caller CRS AS sends a 200 (i.e., Prack) message to the caller terminal.

Step 719: The callee terminal sends a ringing signal "180" to the callee CRS AS.

Step 720: The callee CRS AS instructs the callee MRS to play a callee CRS tone to the callee terminal.

Steps 721-722: The callee CRS AS sends a ringing signal "180" to the caller terminal.

Step 723: The callee terminal goes off-hook, and sends a 200 (i.e., invite) message to the callee CRS AS, indicating that the callee has gone off-hook.

Step 724: The callee CRS AS instructs the callee MRS to stop playing the callee CRS tone to the callee terminal.

Steps 725-726: The callee CRS AS sends a 200 (i.e., invite) message to the caller CRS AS. The caller CRS AS sends the 200 (i.e., invite) message to the caller terminal, indicating that the callee has gone off-hook.

Steps 727-729: The caller terminal sends an ACK message to the callee terminal.

Step 730: The conversation between the caller and the callee is set up.

The eighth to thirteenth embodiments are about a scenario in which the user has subscribed to the CRS filter service. The user may set a CRS filter policy on the CRS filter server. According to the conditions such as different callers and different call time segments, a setting is made about whether to filter out a CRS tone or some CRS media types. For example, only the CRS tones of the callers in the white list are played and the audio part of the CRS tones is filtered out within eight working hours in a day. Besides, the user may set a CRS filter policy on the callee terminal to filter CRS tones.

In the eighth to eleventh embodiments, the CRS tones are filtered by setting a CRS filter policy in the CRS filter AS.

Figure 8:
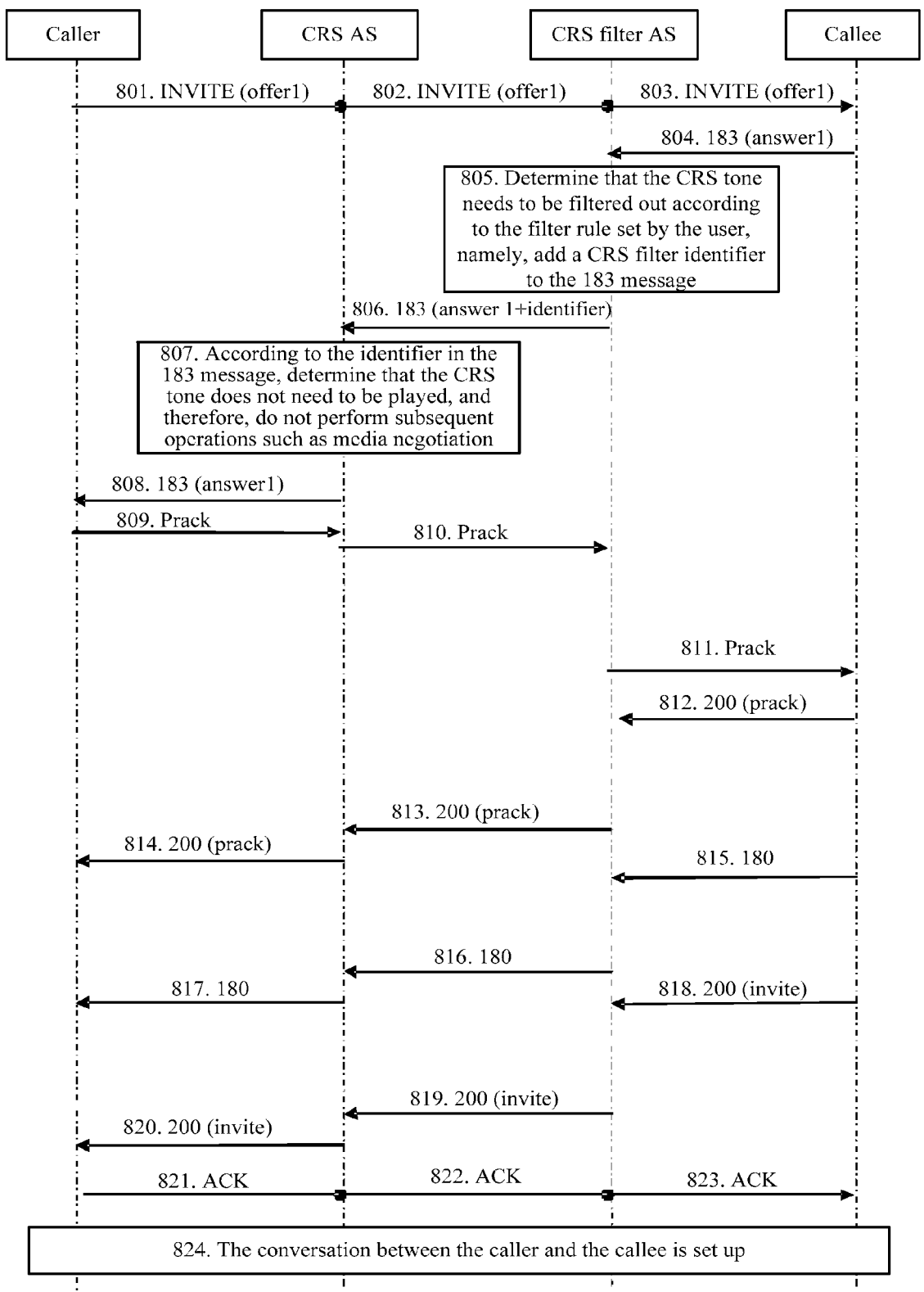
FIG. 8 shows a method for filtering CRS tones in an eighth embodiment of the present disclosure.

As shown in FIG. 8, supposing the user has subscribed to the CRS filter service, a CRS filter policy is set in the CRS filter AS. A method for filtering CRS tones is provided in the eighth embodiment of the present disclosure. The method includes the following steps:

Steps 801-803: These steps are the same as steps 201-203 in FIG. 2. That is, the caller sends a call request "INVITE" to the callee terminal.

Step 804: The callee terminal performs normal media negotiation with the caller terminal through a normal media SDP request (i.e., offer 1) according to the capabilities of the callee terminal, and sends a provisional response to the CRS filter AS. The provisional response carries a normal media SDP answer (i.e., answer 1) applicable to the call after negotiation between the caller terminal and the callee terminal. The provisional response may be a 183 message.

Step 805: The CRS filter AS determines that the CRS tone needs to be filtered out according to the filter rules set by the user.

Step 806: The CRS filter AS sends a provisional response to the CRS AS. The provisional response carries a normal media SDP answer (i.e., answer 1) and a CRS filter identifier. The provisional response may be a 183 message.

Step 807: After obtaining the CRS filter identifier carried in the 183 message by parsing the 183 message, the caller CRS AS does not perform subsequent operations such as CRS media negotiation, but performs the policy of not playing the CRS tone.

Step 808: The CRS AS sends a 183 message to the caller terminal. The 183 message carries the normal media SDP answer (i.e., answer 1) applicable to the call after negotiation between the caller terminal and the callee terminal.

Steps 809-811: The caller terminal sends a provisional reliable response (i.e., Prack message) to the callee terminal.

Steps 812-814: After receiving the provisional reliable response (i.e., Prack message), the callee terminal sends a 200 (i.e., Prack) message to the caller terminal.

Steps 815-818: The callee terminal sends a ringing signal "180" to the caller terminal.

Steps 818-820: The callee terminal sends a 200 (i.e., invite) message to the caller terminal.

Steps 821-828: The caller terminal sends an ACK message to the callee terminal.

Step 824: The conversation between the caller and the callee is set up.

In the eighth embodiment of the present disclosure, the CRS tones set on the CRS AS are filtered according to a CRS filter policy set in the CRS filter AS. The caller CRS tones subscribed and set by the caller (i.e., caller CRS service) may be filtered; the callee CRS tones subscribed and set by the callee (i.e., callee CRS service) may be filtered; and the CRS tones subscribed and set by a third party may be filtered. If both the caller CRS service and the callee CRS service are deployed in the network concurrently, at least one of the caller CRS tones and the callee CRS tones may be filtered by setting a policy of filtering at least one of the caller CRS tones and the callee CRS tones on the CRS filter AS in an embodiment of the present disclosure, and the solutions can be obtained by analogy.

Figure 9:
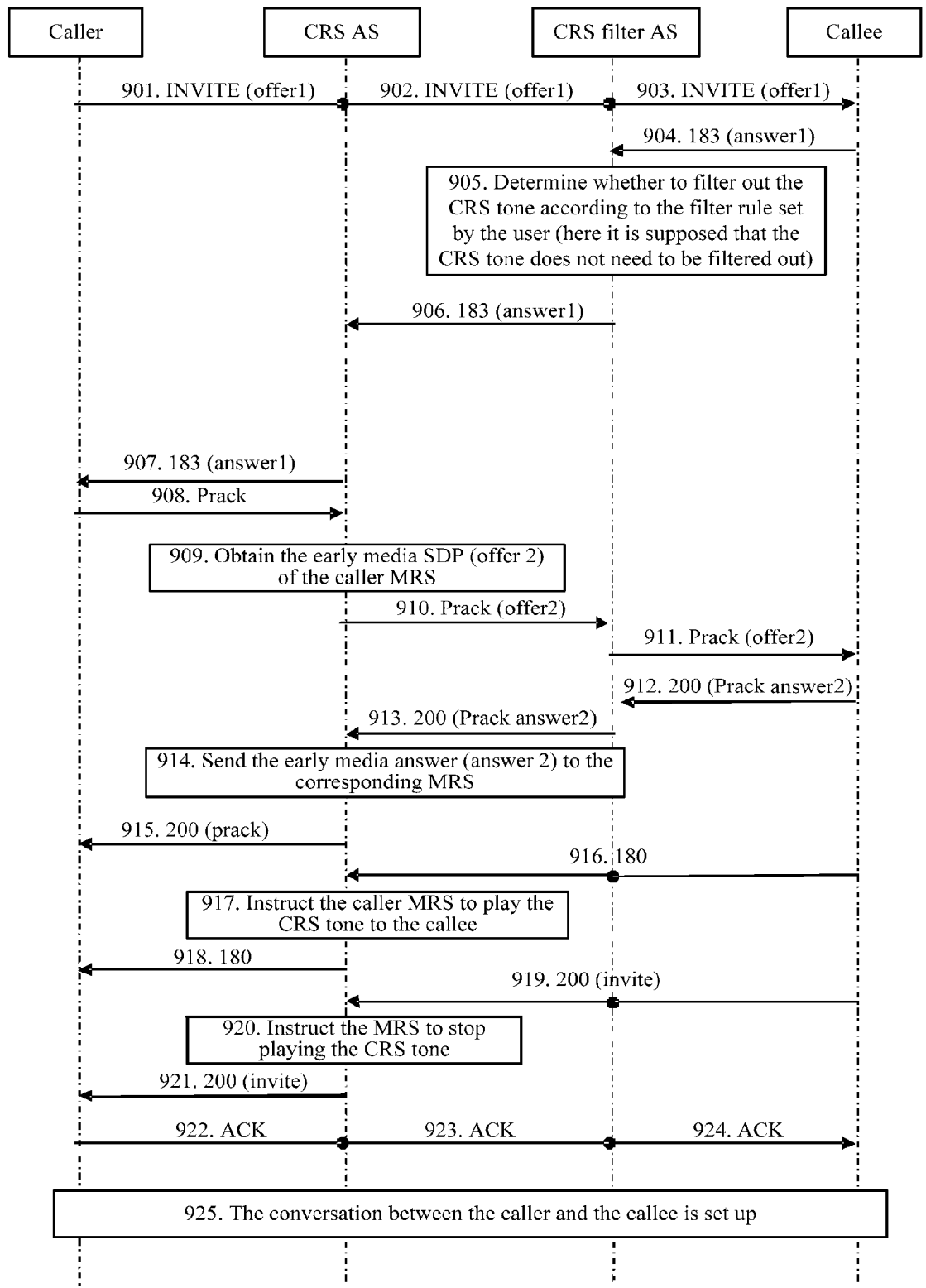
FIG. 9 shows a method for implementing caller CRS services in a ninth embodiment of the present disclosure.

FIG. 9 shows a method for implementing caller CRS services in the ninth embodiment of the present disclosure. The method includes the following steps:

Step 901: The caller terminal sends a call request (namely, an INVITE message) to the CRS AS. The INVITE message carries a caller terminal identifier, a callee terminal identifier, and a normal media SDP request (i.e., offer 1) for the caller terminal to set up a call.

According to the caller terminal identifier carried in the INVITE message and the subscription relation between the caller terminal identifier and the CRS service stored in the HSS, the caller CSCF parses the INVITE message to know that the caller terminal is a CRS service subscriber, and sends the INVITE message to the CRS AS.

Step 902: The CRS AS sends the call request to the CRS filter AS. The call request carries the normal media SDP request (i.e., offer 1) of the caller terminal.

According to the callee terminal identifier carried in the INVITE message and the subscription relation between the callee terminal identifier and the CRS filter service stored in the HSS, the callee CSCF parses the INVITE message to know that the callee terminal is a CRS filter service subscriber, and sends the INVITE message to the CRS filter AS.

Step 903: The CRS filter AS sends the call request to the callee terminal. The call request carries the normal media SDP request (i.e., offer 1) of the caller terminal.

According to the callee terminal identifier carried in the INVITE message and the subscription relation between the callee terminal identifier and the CRS filter service stored in the HSS, the callee CSCF parses the INVITE message to know that the callee terminal is a CRS filter service subscriber, and sends the INVITE message to the CRS filter AS.

Step 904: The callee terminal performs normal media negotiation with the caller terminal through a normal media SDP request (i.e., offer 1) according to the capabilities of the callee terminal, and sends a provisional response to the CRS filter AS. The provisional response carries a normal media SDP answer (i.e., answer 1) applicable to the call after negotiation between the caller terminal and the callee terminal. The provisional response may be a 183 message.

Step 905: The CRS filter AS judges whether to filter out the CRS tone according to the filter rules set by the user. In the process provided in this embodiment, it is supposed that the CRS tone does not need to be filtered out. Therefore, no CRS filter identifier is carried in the message sent subsequently.

Step 906: The CRS filter AS sends a provisional response to the CRS AS. The provisional response carries a normal media SDP answer (i.e., answer 1). The provisional response may be a 183 message.

Steps 907-925 are the same as steps 308-326. That is, the caller media negotiation is performed; a caller CRS tone is played to the callee; and a conversation is set up between the caller and the callee after the callee goes off-hook.

Figure 10:
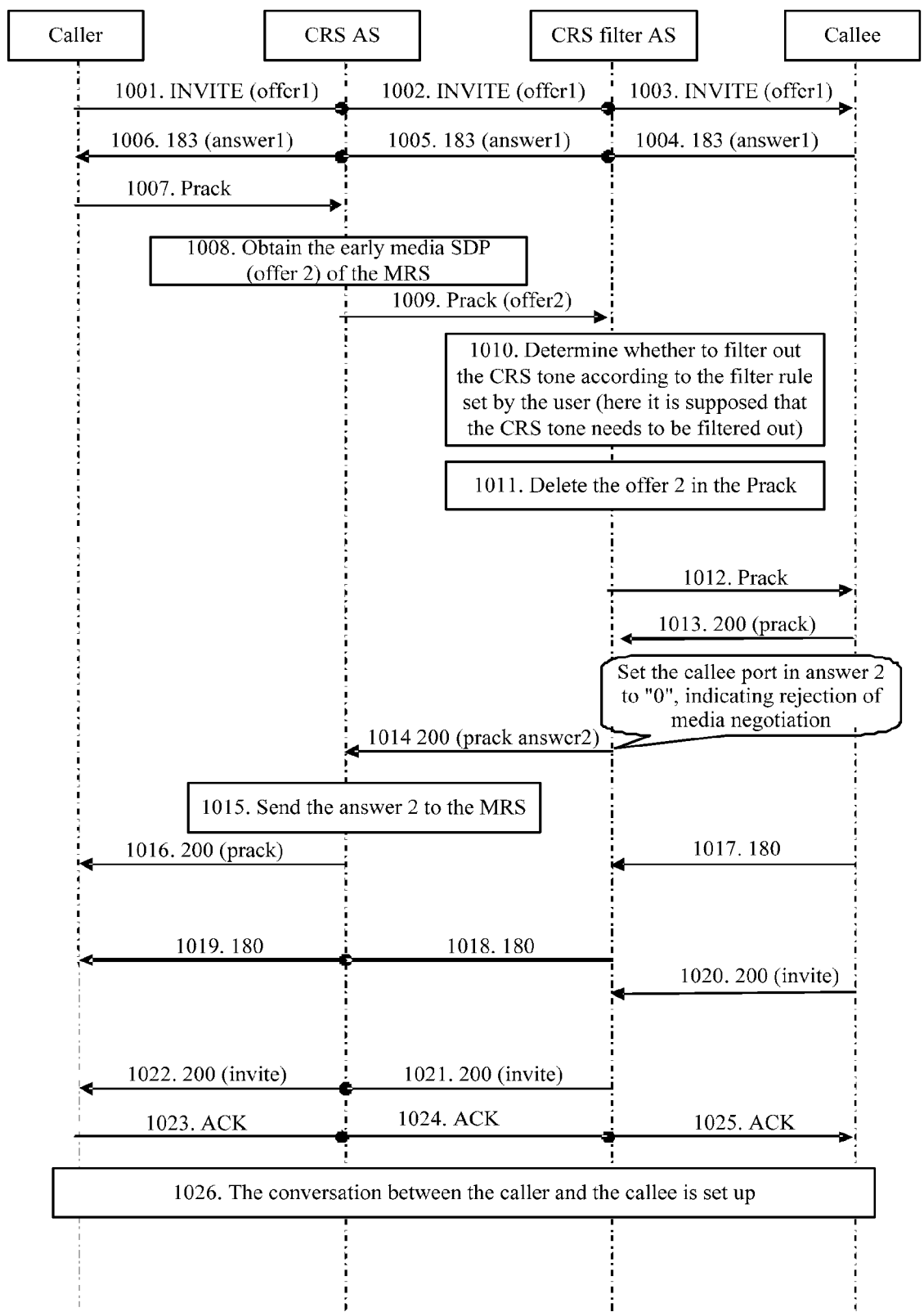
FIG. 10 shows a method for filtering CRS tones in a tenth embodiment of the present disclosure.

FIG. 10 shows a method for filtering CRS tones in the tenth embodiment of the present disclosure. Compared with the foregoing embodiments such as the ninth embodiment, the method for filtering CRS tones in the tenth embodiment differs in that: in the ninth embodiment, the CRS filter AS performs the normal CRS process if determining not to filter CRS tones; in the tenth embodiment, if determining to filter CRS tones, the CRS filter AS rejects the early CRS media negotiation in place of the callee terminal after receiving an early CRS media offer, thus filtering the CRS tones. The method for filtering CRS tones in the tenth embodiment of the present disclosure includes the following steps.

Step 1001: The caller terminal sends a call request (namely, an INVITE message) to the CRS AS. The INVITE message carries a caller terminal identifier, a callee terminal identifier, and a normal media SDP request (i.e., offer 1) for the caller terminal to set up a call.

According to the caller terminal identifier carried in the INVITE message and the subscription relation between the caller terminal identifier and the CRS service stored in the HSS, the caller CSCF parses the INVITE message to know that the caller terminal is a CRS service subscriber, and sends the INVITE message to the CRS AS.

Step 1002: The CRS AS sends a call request to the CRS filter AS. The call request carries the normal media SDP request (i.e., offer 1) of the caller terminal.

According to the callee terminal identifier carried in the INVITE message and the subscription relation between the callee terminal identifier and the CRS filter service stored in the HSS, the callee CSCF parses the INVITE message to know that the callee terminal is a CRS filter service subscriber, and sends the INVITE message to the CRS filter AS.

Step 1003: The CRS filter AS sends a call request to the callee terminal. The call request carries the normal media SDP request (i.e., offer 1) of the caller terminal.

Step 1004: The callee terminal performs normal media negotiation with the caller terminal through a normal media SDP request (i.e., offer 1) according to the capabilities of the callee terminal, and sends a provisional response to the CRS filter AS. The provisional response carries a normal media SDP answer (i.e., answer 1) applicable to the call after negotiation between the caller terminal and the callee terminal. The provisional response may be a 183 message.

Step 1005: The CRS filter AS sends a provisional response to the CRS AS. The provisional response carries a normal media SDP answer (i.e., answer 1) applicable to the call after negotiation between the caller terminal and the callee terminal. The provisional response may be a 183 message.

Step 1006: The CRS AS sends a provisional response to the caller terminal. The provisional response carries a normal media SDP answer (i.e., answer 1) applicable to the call after negotiation between the caller terminal and the callee terminal. The provisional response may be a 183 message.

Step 1007: The caller terminal sends a provisional reliable response (namely, a Prack message) to the CRS AS.

Step 1008: After receiving the Prack message, the CRS AS obtains an early media SDP request (i.e., offer 2) from the MRS for the purpose of performing early CRS media negotiation.

Step 1009: The CRS AS sends a provisional reliable response (namely, a Prack message (i.e., offer 2)) to the CRS filter AS. The Prack message carries the early media SDP request (i.e., offer 2) of the MRS.

Step 1010: The CRS filter AS judges whether to filter out the CRS tone according to the CRS filter rules set by the user. In the process provided in this embodiment, it is supposed that the CRS tone needs to be filtered out.

This embodiment supposes that the CRS tones are filtered out completely. In practice, partial filtering can be set. That is, some media types of the CRS tones are filtered out; for example, only audio media are filtered out. If determining that only audio media need to be filtered out, the CRS filter AS controls the subsequent CRS media negotiation (for example, deletes the audio media types in offer 2, without performing media negotiation of the audio part), thus implementing partial filtering.

Step 1011: If determining that the CRS tones need to be filtered, the CRS filter AS deletes the early media SDP request (i.e., offer 2) of the MRS carried in the Prack message.

Step 1012: The CRS filter AS sends the Prack message to the callee terminal.

Step 1013: The callee terminal sends a 200 (i.e., Prack) message to the CRS filter AS.

Step 1014: The CRS filter AS sends a 200 (i.e., Prack answer 2) message to the CRS AS. In the answer 2, the callee port is set to "0", indicating rejection of media negotiation.

Step 1015: The CRS AS sends an early CRS media answer (i.e., answer 2) to a corresponding MRS.

Step 1016: The CRS AS sends a 200 (i.e., Prack) message to the caller terminal.

Step 1017: The callee terminal sends a ringing signal "180" to the CRS AS.

Step 1018: The CRS filter AS sends a ringing signal "180" to the CRS AS.

Step 1019: The CRS AS sends the ringing signal "180" to the caller terminal.

Step 1020: The callee terminal goes off-hook, and sends a 200 (i.e., invite) message to the CRS filter AS, indicating that the callee terminal has gone off-hook.

Step 1021: The CRS filter AS sends a 200 (i.e., invite) message to the CRS AS, indicating that the callee terminal has gone off-hook.

Step 1022: The CRS AS sends a 200 (i.e., invite) message to the caller terminal, indicating that the callee terminal has gone off-hook.

Steps 1022-1024: The caller terminal sends an ACK message to the callee terminal.

Step 1025: The conversation between the caller and the callee is set up.

Figure 11:
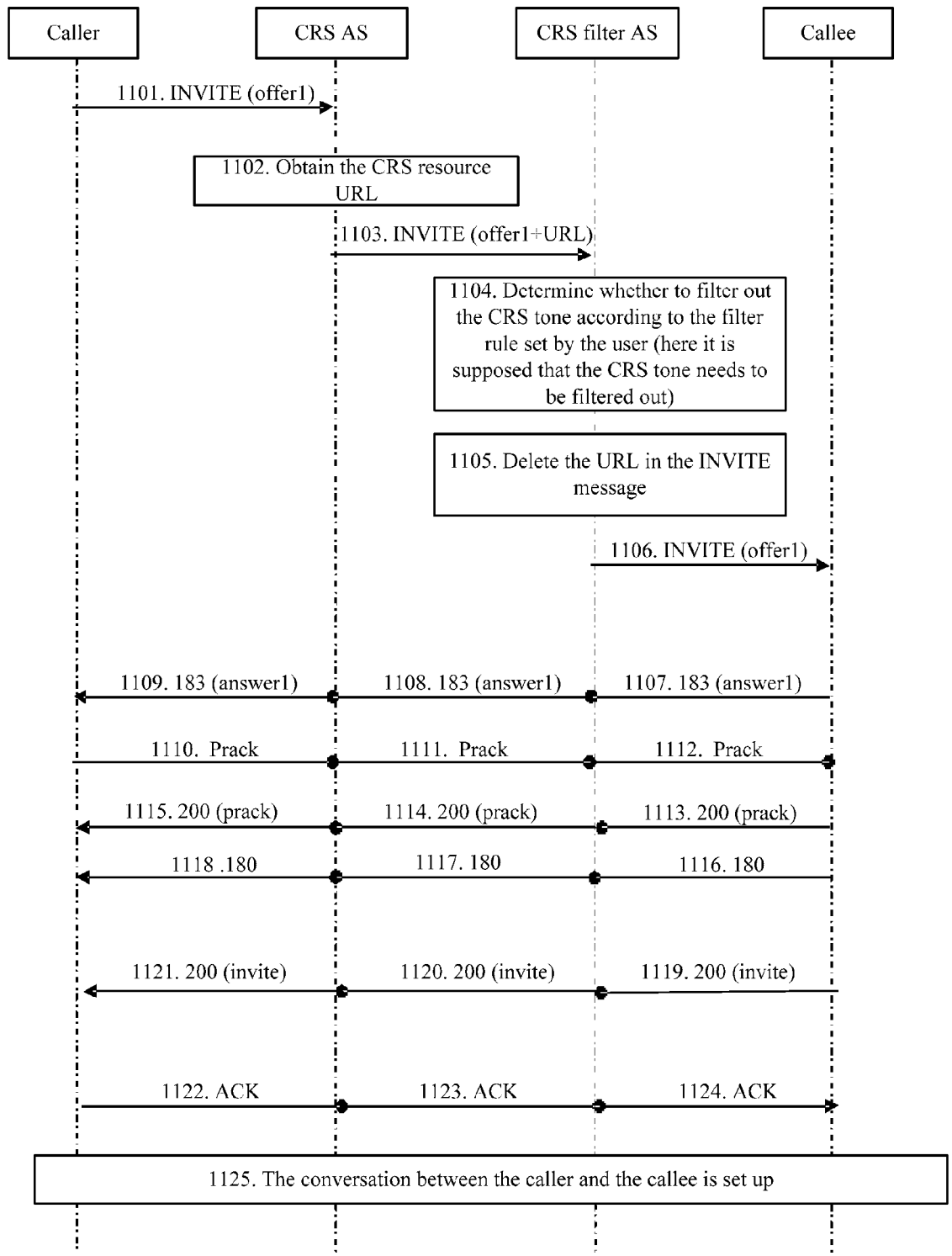
FIG. 11 shows a method for filtering CRS tones in an eleventh embodiment of the present disclosure.

As shown in FIG. 11, a method for filtering CRS tones is provided in the eleventh embodiment of the present disclosure with respect to the solution to downloading and playing CRS tones. Compared with the method in the foregoing embodiments such as the ninth and tenth embodiments, the method in the eleventh embodiment differs in that: the ninth and tenth embodiments are intended for the early CRS media negotiation solution, where the CRS filter AS performs operations according to the filter policy. If the filter policy indicates that the CRS tone does not need to be filtered out, the CRS filter AS performs the normal CRS process (embodiment 9). If the filter policy indicates that the CRS tone needs to be filtered out (embodiment 10), the CRS filter AS rejects the early CRS media negotiation in place of the callee terminal. The eleventh embodiment is intended for the solution to downloading and playing CRS tones, where the CRS filter AS performs operations according to the filter policy after receiving the CRS tone URL, and deletes the CRS tone URL in the message if the filter policy indicates that the CRS tone needs to be filtered out. The method for filtering CRS tones in the eleventh embodiment of the present disclosure includes the following steps.

Step 1101: The caller terminal sends a call request (namely, an INVITE message) to the CRS AS. The INVITE message carries a caller terminal identifier, a callee terminal identifier, and a normal media SDP request (i.e., offer 1) for the caller terminal to set up a call.

According to the caller terminal identifier carried in the INVITE message and the subscription relation between the caller terminal identifier and the CRS service stored in the HSS, the caller CSCF parses the INVITE message to know that the caller terminal is a CRS service subscriber, and sends the INVITE message to the CRS AS.

Step 1102: The CRS AS obtains the CRS resource URL.

Step 1103: The CRS AS sends an INVITE message (including offer1 and URL) to the CRS filter AS.

According to the callee terminal identifier carried in the INVITE message and the subscription relation between the callee terminal identifier and the CRS filter service stored in the HSS, the callee CSCF parses the INVITE message to know that the callee terminal is a CRS filter service subscriber, and sends the INVITE message to the CRS filter AS.

If the CRS media resource is little, the CRS media may be sent to the callee through a SIP message (such as an INVITE message) directly to avoid the trouble of sending a URL of the media and downloading the media on the callee terminal.

Step 1104: The CRS AS judges whether to filter out the CRS tone according to the filter rules set by the user. In the process provided in this embodiment, it is supposed that the CRS tone needs to be filtered out.

Step 1105: The CRS filter AS deletes the URL in the INVITE message.

If the CRS media resource is carried in the INVITE directly, the CRS filter AS deletes the CRS media resource in the INVITE message.

Step 1106: The CRS filter AS sends the INVITE (i.e., offer 1) message to the callee terminal.

Step 1107: The callee terminal sends a 183 message to the CRS filter AS. The 183 message carries a normal media SDP answer (i.e., answer 1) applicable to the call after negotiation between the caller terminal and the callee terminal.

Step 1108: The CRS filter AS sends the 183 message to the CRS AS.

Step 1109: The CRS AS sends the 183 message to the callee terminal. The INVITE message carries a normal media SDP answer (i.e., answer 1) applicable to the call after negotiation between the caller terminal and the callee terminal.

Step 1110: The caller terminal sends a Prack message to the CRS AS.

Step 1111: The CRS AS sends the Prack message to the CRS filter AS.

Step 1112: The CRS filter AS sends the Prack message to the callee terminal.

Step 1113: The callee terminal sends a 200 (i.e., Prack) message to the CRS filter AS.

Step 1114: The CRS filter AS sends the 200 (i.e., Prack) message to the CRS AS.

Step 1115: The CRS AS sends the 200 (i.e., Prack) message to the caller terminal.

Step 1116: The callee terminal sends a ringing signal "180" to the CRS filter AS.

Step 1117: The CRS filter AS sends a ringing signal "180" to the CRS AS.

Step 1118: The CRS AS sends the ringing signal "180" to the caller terminal.

Step 1119: The callee goes off-hook, and the callee terminal sends a 200 (i.e., invite) message to the CRS filter AS. The CRS filter AS sends the 200 (i.e., invite) message to the CRS AS. The CRS AS sends the 200 (i.e., invite) message to the caller terminal, indicating that the callee terminal has gone off-hook.

Step 1122: The caller terminal sends an ACK message to the CRS AS.

Step 1123: The CRS AS sends the ACK message to the CRS filter AS.

Step 1124: The CRS filter AS sends the ACK message to the callee terminal.

Step 1125: The conversation between the caller and the callee is set up.

In the foregoing eleventh embodiment, the method for filtering CRS tones is implemented by setting a CRS filter policy in the CRS filter AS. In practice, the user may set a CRS filter policy on the callee terminal to filter CRS tones, which differs from the method provided in the eleventh embodiment in that: after receiving the call request (i.e., invite message) that carries a CRS media resource or its URL, the callee terminal judges whether to filter out the CRS tone. If determining that the CRS tone needs to be filtered out, the callee terminal does not download or play the CRS media, or does not display the CRS media resource carried in the invite message.

In the twelfth and thirteenth embodiments, the CRS tone is filtered by setting a CRS filter policy at the callee terminal.

Figure 12:
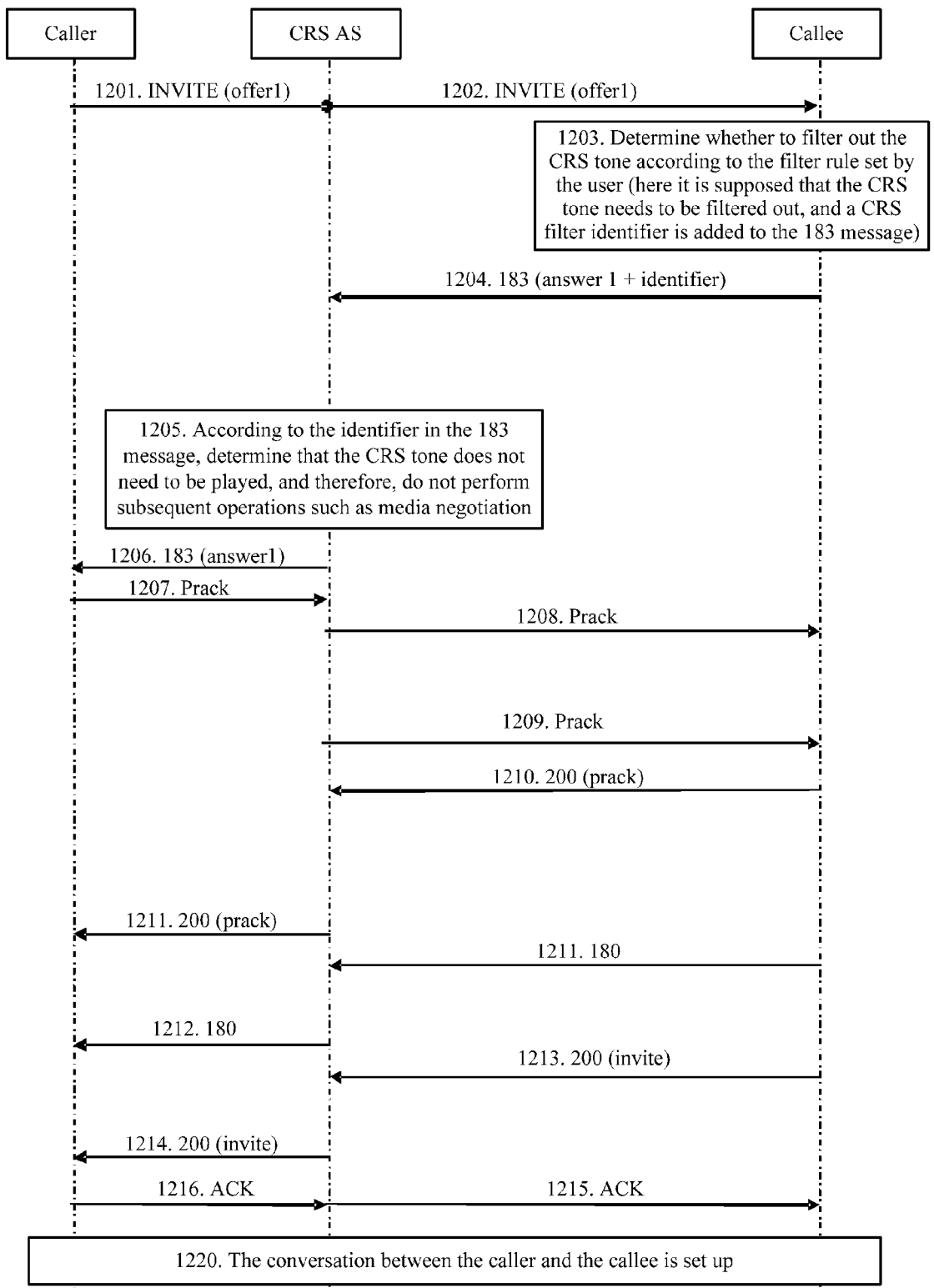
FIG. 12 shows a method for filtering CRS tones in a twelfth embodiment of the present disclosure.

FIG. 12 shows a method for filtering CRS tones in the twelfth embodiment of the present disclosure. The method includes the following steps:

Step 1201: The caller terminal sends a call request (namely, an INVITE message) to the CRS AS. The INVITE message carries a caller terminal identifier, a callee terminal identifier, and a normal media SDP request (i.e., offer 1) for the caller terminal to set up a call.

According to the caller terminal identifier carried in the INVITE message and the subscription relation between the caller terminal identifier and the CRS service stored in the HSS, the caller CSCF parses the INVITE message to know that the caller terminal is a CRS service subscriber, and sends the INVITE message to the CRS AS.

Step 1202: The CRS AS sends the call request to the callee terminal through a callee CSCF. The call request carries the normal media SDP request (i.e., offer 1) of the caller terminal.

Step 1203: The callee terminal judges whether to filter out the CRS tone according to the filter rules set by the user. In the process provided in this embodiment, it is supposed that the CRS tone needs to be filtered out.

Step 1204: The callee terminal sends a 183 message to the CRS AS. The message carries a normal media SDP answer (i.e., answer 1) applicable to the call after negotiation between the caller terminal and the callee terminal, and carries a CRS tone identifier of the CRS tone to be filtered out.

Step 1205: According to the CRS tone identifier of the CRS tone to be filtered out in the 183 message, the CRS AS determines that the CRS tone does not need to be played, and therefore, does not perform subsequent operations such as media negotiation.

Step 1206: The CRS AS sends the 183 message to the caller terminal. The 183 message carries a normal media SDP answer (i.e., answer 1) applicable to the call after negotiation between the caller terminal and the callee terminal.

Step 1207: The caller terminal sends a Prack message to the CRS AS.

Step 1208: The CRS AS sends the Prack message to the callee terminal.

Step 1209: The callee terminal sends a 200 (i.e., Prack) message to the CRS AS.

Step 1210: The CRS AS sends the 200 (i.e., Prack) message to the caller terminal.

Steps 1211-1212: The callee terminal sends a ringing signal "180" to the callee CRS AS. The CRS AS sends the ringing signal "180" to the caller terminal, indicating that the callee terminal has rung.

Step 1213: The callee terminal goes off-hook, and sends a 200 (i.e., invite) message to the CRS AS. The 200 message carries an INVITE message, which requests the callee CRS AS to stop playing the callee CRS tone to the callee.

Step 1214: The CRS AS sends the 200 (i.e., invite) message to the caller terminal.

Steps 1215-1216: The caller terminal sends an ACK message to the callee terminal.

Step 1217: The conversation between the caller and the callee is set up.

Figure 13:
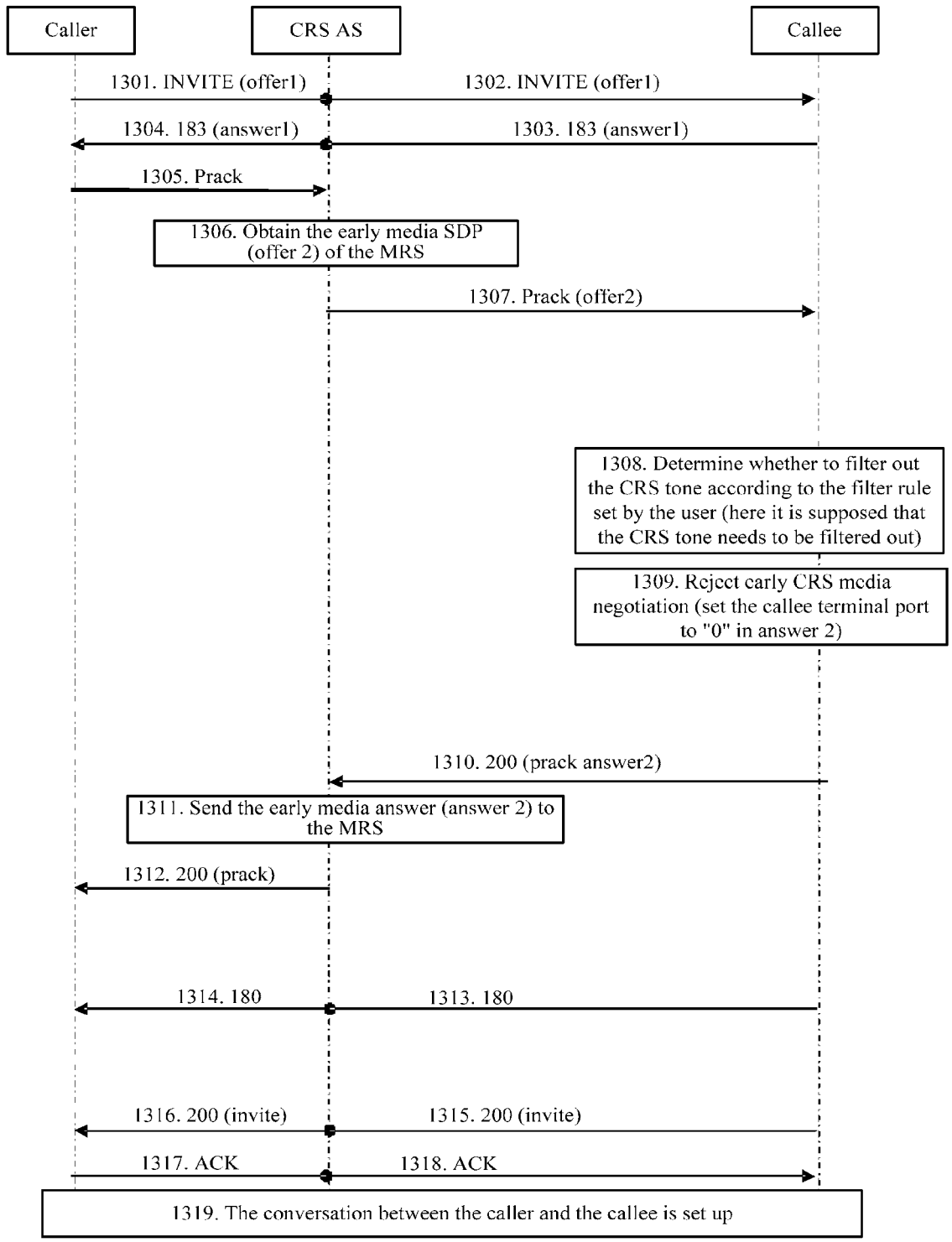
FIG. 13 shows a method for filtering CRS tones in a thirteenth embodiment of the present disclosure.

FIG. 13 shows a method for filtering CRS tones in the thirteenth embodiment of the present disclosure. Compared with the method of playing a callee CRS tone in the foregoing embodiments such as the twelfth embodiment, the method provided in the thirteenth embodiment differs in that: in the twelfth embodiment, a second provisional response (i.e., 183 message) that carries a callee CRS tone identifier is sent to instruct the CRS AS not to perform the CRS process; in the thirteenth embodiment, the callee terminal rejects the early CRS media negotiation directly. The method for filtering CRS tones in the thirteenth embodiment of the present disclosure includes the following steps.

Step 1301: The caller terminal sends a call request (namely, an INVITE message) to the CRS AS. The INVITE message carries a caller terminal identifier, a callee terminal identifier, and a normal media SDP request (i.e., offer 1) for the caller terminal to set up a call.

According to the caller terminal identifier carried in the INVITE message and the subscription relation between the caller terminal identifier and the CRS service stored in the HSS, the caller CSCF parses the INVITE message to know that the caller terminal is a CRS service subscriber, and sends the INVITE message to the CRS AS.

Step 1302: The CRS AS sends a call request to the callee terminal. The call request carries the normal media SDP request (i.e., offer 1) of the caller terminal.

Step 1303: The callee terminal performs normal media negotiation according to its own capabilities, and sends a 183 message to the CRS AS. The 183 message carries a normal media SDP answer (i.e., answer 1) applicable to the call after negotiation between the caller terminal and the callee terminal.

Step 1304: The CRS AS sends the 183 message to the caller terminal. The 183 message carries the normal media SDP answer (i.e., answer 1) applicable to the call after negotiation between the caller terminal and the callee terminal.

Step 1305: The caller terminal sends a Prack message to the CRS AS.

Step 1306: The CRS AS obtains an early CRS media SDP request (i.e., offer 2) from the MRS.

Step 1307: The CRS AS sends a Prack message to the callee terminal. The Prack message carries the early CRS media SDP request (i.e., offer 2).

Step 1308: The CRS filter AS judges whether to filter out the CRS tone according to the CRS filter rules set by the user. In the process provided in this embodiment, it is supposed that the CRS tone needs to be filtered out.

In this embodiment, it is supposed that the CRS tone needs to be filtered out completely. In practice, the user may set partial filtering; that is, only some types of media of the CRS tone (for example, audio media) are filtered out. If determining that only audio needs to be filtered out, the callee terminal performs subsequent CRS media negotiation selectively (for example, without negotiating audio media), thus implementing partial filtering.

Step 1309: After determining that the CRS tone needs to be filtered out, the callee terminal rejects the early CRS media negotiation and sets the port of the callee terminal to "0" in answer 2.

Alternatively, the foregoing function may also be implemented by performing the early CRS media negotiation normally but without opening the media path or playing the received CRS media package subsequently.

Step 1310: The callee terminal sends a 200 (i.e., Prack answer 2) message to the CRS AS.

Step 1311: The CRS AS sends an early media answer (i.e., answer 2) to the MRS.

Step 1312: The CRS AS sends the 200 (i.e., Prack) message to the caller terminal.

Step 1313: The callee terminal sends a ringing signal "180" to the CRS AS.

Step 1314: The CRS AS sends the ringing signal "180" to the caller terminal.

Step 1315: The callee terminal goes off-hook, and sends a 200 (i.e., invite) message to the CRS AS, indicating that the callee has gone off-hook.

Step 1316: The CRS AS sends a 200 (i.e., invite) message to the caller terminal, indicating that the callee has gone off-hook.

Steps 1317-1318: The caller terminal sends an ACK message to the callee terminal.

Step 1319: The conversation between the caller and the callee is set up.

In the foregoing second, fourth, sixth, eighth, tenth, and twelfth embodiments and variations thereof, setting of "playing a caller CRS tone" may be replaced by setting of "filtering out a callee CRS tone." Likewise, setting of "playing a callee CRS tone" may be replaced by setting of "filtering out a caller CRS tone." In the second, fourth and eighth embodiments and variations thereof, the "caller CRS tone identifier" added to the SIP message may be replaced by "callee CRS tone filter identifier", and the "callee CRS tone identifier" may be replaced by "caller CRS tone filter identifier."

Figure 14:
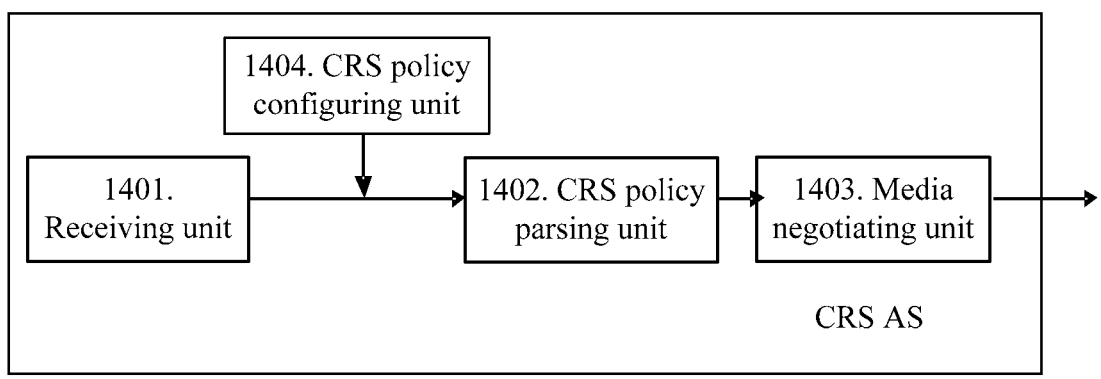
FIG. 14 shows a CRS AS provided in a fourteenth embodiment of the present disclosure.

FIG. 14 shows a CRS AS provided in the fourteenth embodiment of the present disclosure. The CRS AS includes: (1) a receiving unit 1401, adapted to receive a call request initiated by a caller terminal; (2) a CRS policy parsing unit 1402, adapted to: parse a policy of playing CRS tones according to the call request, and trigger the caller CRS tone or the callee CRS tone according to the policy; and (3) a media negotiating unit 1403, adapted to perform media negotiation between the caller terminal and the MRS decided by the policy according to the result of parsing the policy.

The CRS AS provided in the fourteenth embodiment may further include a CRS policy configuring unit 1404, adapted to set the policy of playing a CRS tone, namely, playing a caller CRS tone or playing a callee CRS tone.

Figure 15:
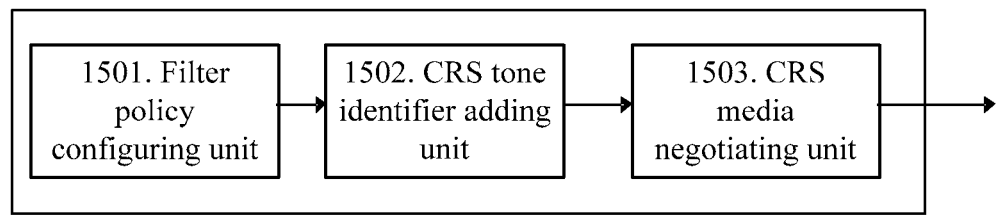
FIG. 15 shows a callee terminal provided in a fifteenth embodiment of the present disclosure.

FIG. 15 shows a callee terminal provided in the fifteenth embodiment of the present disclosure. The callee terminal includes: (1) a filter policy configuring unit 1501, adapted to set a policy of filtering a CRS tone, namely, filtering a caller CRS tone and filtering a callee CRS tone; and (2) a CRS tone identifier adding unit 1502, adapted to send an identifier to the CRS AS according to the policy, where the identifier may be an identifier of the caller CRS tone to be filtered out, or an identifier of the callee CRS tone to be filtered out, or identifiers of the caller CRS tone and the callee CRS tone to be filtered out.

The callee terminal provided in the fifteenth embodiment may also include a CRS media negotiating unit 1503, adapted to: perform early callee CRS media negotiation according to the identifier of the caller CRS tone to be filtered out, or perform early caller CRS media negotiation according to the identifier of the callee CRS tone to be filtered out, or perform no early CRS media negotiation according to the identifiers of the caller CRS tone and callee CRS tone to be filtered out.

Figure 16:
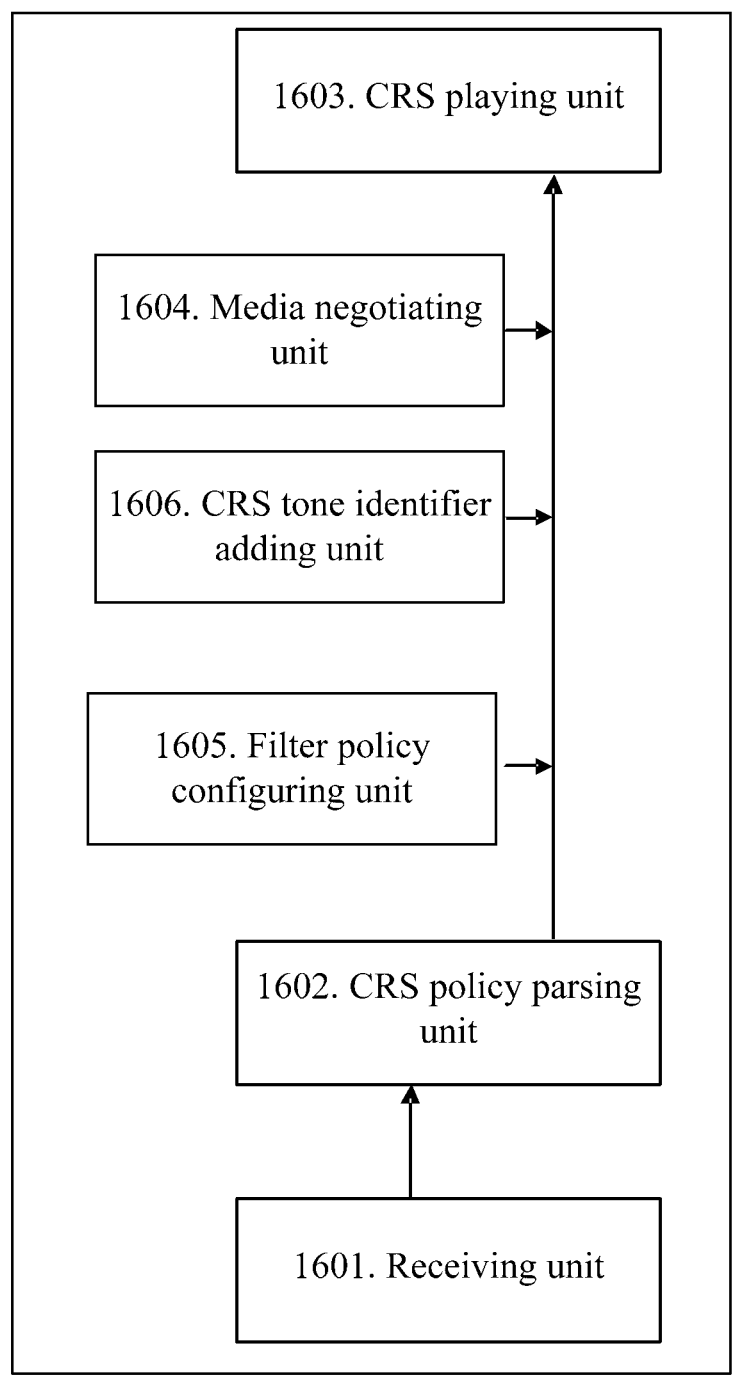
FIG. 16 shows a callee terminal provided in a sixteenth embodiment of the present disclosure.

FIG. 16 shows a callee terminal provided in the sixteenth embodiment of the present disclosure. The callee terminal includes: (1) a receiving unit 1601, adapted to receive a call request initiated by a caller terminal; (2) a CRS policy parsing unit 1602, adapted to obtain a policy of playing a CRS tone, namely, playing a caller CRS tone or playing a callee CRS tone, according to the call request; and (3) a CRS playing unit 1603, adapted to play the CRS tone to the callee according to the policy of playing the CRS tone.

The callee terminal provided in the sixteenth embodiment may further include: (1) a CRS media negotiating unit 1604, adapted to perform early caller CRS media negotiation according to the policy of playing the CRS tone that the caller CRS tone needs to be played, or perform early callee CRS media negotiation according to the policy of playing the CRS tone that the callee CRS tone needs to be played; (2) a filter policy configuring unit 1605, adapted to set a policy of filtering a CRS tone, namely, filtering a caller CRS tone and a callee CRS tone; and (3) a CRS tone identifier adding unit 1606, adapted to send an identifier to the CRS AS according to the policy, where the identifier may be an identifier of the caller CRS tone to be filtered out, or an identifier of the callee CRS tone to be filtered out, or identifiers of the caller CRS tone and the callee CRS tone to be filtered out.

Through the embodiments of the present disclosure, a policy of playing a CRS tone to the callee is set at the CRS AS or the callee terminal, and the CRS service can be experienced in the case that both the caller and the callee have subscribed to the CRS service. Users can select the customized CRS media on the network, and make the best of the network media file resources of the users, thus implementing unified configuration and management easily. Moreover, the user-defined CRS media files can be downloaded through the callee terminal, and played to the callee, which enhances the availability and fun of CRS media resources. Furthermore, through the embodiments of the present disclosure, the callee can filter out or reselect a CRS tone using a CRS filter AS or by setting a policy of filtering CRS tones at the callee terminal. Therefore, individuals can set and select a CRS tone at their discretion.

It is apparent that those skilled in the art can make various modifications and variations to the present disclosure without departing from the spirit and scope of the present disclosure. The present disclosure is intended to cover such modifications and variations provided that they fall in the scope of protection defined by the following claims or their equivalents.

What is claimed is:

1. A method for implementing Customized Ringing Signal (CRS) services, comprising:
    receiving, by a callee CRS Application Server (AS), a call request initiated by a caller terminal;
    based on the received call request, determining, by the callee CRS Application Server (AS), that the callee CRS tone needs to be played in accordance with a corresponding policy that includes a priority for playing a caller CRS tone or a callee CRS tone;
    based on the determination, substituting, by the callee CRS AS, an early callee CRS media request for an early caller CRS media request, after receiving the early caller CRS media request from a caller CRS AS;
    performing, by the callee CRS AS, callee CRS media negotiation with the callee terminal using the early callee CRS media request; and
    thereafter, instructing, by the callee CRS AS, a media resource server (MRS) to play a callee CRS tone to the callee terminal.

2. The method of claim 1, further comprising:
    configuring the policy of playing the CRS tone on one of the callee CRS AS, and a callee CRS management system.

3. A method for implementing Customized Ringing Signal (CRS) services, the method comprising:
    receiving, by a Callee CRS Application Server (AS), a call request comprising a Uniform Resource Locator (URL) of a caller CRS tone;
    based on the call request, determining, by the Callee CRS AS, that a callee CRS tone needs to be played in accordance with a corresponding policy that includes a priority for playing a caller CRS tone or a callee CRS tone;
    based on the determination, substituting, by the Callee CRS AS, an obtained URL of the callee CRS tone for the URL of the caller CRS tone in the call request; and
    sending, by the Callee CRS AS, the call request comprising the URL of the callee CRS tone to the callee terminal to indicate the callee terminal to download the callee CRS tone using the URL of the callee CRS tone in the call request.

4. A method for implementing Customized Ringing Signal (CRS) services, the method comprising:
    receiving, by a CRS filter Application Server (AS), a call request initiated by a caller terminal;
    determining, by the CRS filter AS, that a CRS tone needs to be filtered out according to the call request and a policy of filtering a CRS tone;
    based on the determination, rejecting, by the CRS filter AS, a CRS media negotiation with a CRS AS processing a CRS tone which is determined to be filtered out, when receiving a Prack message from the CRS AS, wherein the Prack message comprises an early media Session Description Protocol (SDP) request, wherein the rejecting the CRS media negotiation comprises:
    sending, by the CRS filter AS, a response message for responding to the Prack message to the CRS AS, wherein the response message comprises an early media SDP answer, and the callee port in the early media SDP answer is set to zero, which indicates rejection of media negotiation.

5. The method of claim 4, wherein when receiving the Prack message from the CRS AS, the method further comprises:
    deleting, by the CRS filter AS, the early media SDP request in the Prack message; and
    forwarding, by the CRS filter AS, the Prack message without the early media SDP request to the callee terminal.

6. The method of claim 5, wherein the early media SDP request is an early CRS media SDP request, the response message is 200 message and the early media SDP answer is an early CRS media SDP answer.

7. A CRS Application Server (AS) for implementing Customized Ringing Signal (CRS) services, the CRS AS comprising a receiver, a transmitter and a processor, wherein:
    the receiver is configured to receive a call request initiated by a caller terminal; and
    the processor is configured to determine, based on the received call request, that the callee CRS tone needs to be played in accordance with a corresponding policy that includes a priority for playing a caller CRS tone or a callee CRS tone, to substitute, based on the determination, an early callee CRS media request for an early caller CRS media request, after receiving the early caller CRS media request from a caller CRS AS, and to perform callee CRS media negotiation with the callee terminal using the early callee CRS media request;
    the transmitter is configured to instruct a media resource server (MRS) to play a callee CRS tone to the callee terminal after the callee CRS media negotiation.

8. A CRS Application Server (AS) for implementing Customized Ringing Signal (CRS) services, the CRS AS comprising a receiver, a transmitter and a processor, wherein:
    the receiver is configured to receive a call request comprising a Uniform Resource Locator (URL) of a caller CRS tone;
    the processor is configured to determine, based on the received call request, that a callee CRS tone needs to be played in accordance with a corresponding policy that includes a priority for playing a caller CRS tone or a callee CRS tone, and to substitute, based on the determination, an obtained URL of the callee CRS tone for the URL of the caller CRS tone in the call request;
    the transmitter is configured to send the call request comprising the URL of the callee CRS tone to the callee terminal to indicate the callee terminal to download the callee CRS tone using the URL of the callee CRS tone in the call request.

9. A CRS filter Application Server (AS) for implementing Customized Ringing Signal (CRS) services, the CRS filter AS comprising a receiver and a processor, wherein:
    the receiver is configured to receive a call request initiated by a caller terminal and a Prack message from the CRS AS, wherein the Prack message comprises an early media Session Description Protocol (SDP) request;

the processor is configured to determine that a CRS tone needs to be filtered out according to the call request and a policy of filtering a CRS tone, and to reject, based on the determination, a CRS media negotiation with a CRS AS processing a CRS tone which is determined to be filtered out when receiving the Prack message from the CRS AS, wherein the CRS filter AS further comprises a transmitter, and the processor is further configured to set the callee port in an early media SDP answer within a response message for responding to the Prack message to zero, which indicates rejection of media negotiation; and the transmitter is configured to send the response message to the CRS AS.

10. The CRS filter AS according to claim 9, wherein the processor is further configured to delete the early media SDP request in the Prack message; and the transmitter is further configured to forward the Prack message without the early media SDP request to the callee terminal.

11. The CRS filter AS according to claim 10, wherein the early media SDP request is an early CRS media SDP request, the response message is 200 message and the early media SDP answer is an early CRS media SDP answer.

* * * * *